US012064747B2

(12) United States Patent
Costantino et al.

(10) Patent No.: US 12,064,747 B2
(45) Date of Patent: *Aug. 20, 2024

(54) CARBON-BASED COMPOSITIONS WITH HIGHLY EFFICIENT VOLUMETRIC GAS SORPTION

(71) Applicant: Group14 Technologies, Inc., Woodinville, WA (US)

(72) Inventors: Henry R. Costantino, Woodinville, WA (US); Alan Tzu-Yang Chang, Renton, WA (US); Chad Goodwin, Seattle, WA (US); Cory Mekelburg, Hagerstown, MD (US); Liam Cover, Seattle, WA (US); Benjamin E. Kron, Seattle, WA (US); Katharine Geramita, Seattle, WA (US); Aaron M. Feaver, Seattle, WA (US); Leah A. Thompkins, Seattle, WA (US)

(73) Assignee: Group14 Technologies, Inc., Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,634

(22) Filed: Jun. 2, 2023

(65) Prior Publication Data

US 2023/0321629 A1 Oct. 12, 2023

Related U.S. Application Data

(60) Continuation of application No. 17/023,019, filed on Sep. 16, 2020, now Pat. No. 11,707,728, which is a continuation of application No. 16/219,678, filed on Dec. 13, 2018, now Pat. No. 10,814,304, which is a division of application No. 14/533,956, filed on Nov. 5, 2014, now Pat. No. 10,195,583.

(60) Provisional application No. 61/900,310, filed on Nov. 5, 2013.

(51) Int. Cl.
| C01B 32/30 | (2017.01) |
| B01J 20/20 | (2006.01) |
| B01J 20/28 | (2006.01) |
| C01B 3/00 | (2006.01) |
| C10L 3/06 | (2006.01) |
| C10L 3/10 | (2006.01) |

(52) U.S. Cl.
CPC ......... *B01J 20/20* (2013.01); *B01J 20/28004* (2013.01); *B01J 20/28011* (2013.01); *B01J 20/28016* (2013.01); *B01J 20/28066* (2013.01); *B01J 20/28073* (2013.01); *C01B 3/0021* (2013.01); *C01B 3/0084* (2013.01); *C01B 32/30* (2017.08); *C10L 3/06* (2013.01); *C10L 3/10* (2013.01); *C01P 2006/12* (2013.01); *C01P 2006/14* (2013.01); *Y02E 60/32* (2013.01)

(58) Field of Classification Search
CPC ...................................................... C01B 32/30
See application file for complete search history.

(56) References Cited

U.S. PATENT DOCUMENTS

| 2,282,235 | A | 5/1942 | Moberly |
| 3,518,123 | A | 6/1970 | Katsoulis et al. |
| 3,582,288 | A | 6/1971 | Taylor et al. |
| 3,619,428 | A | 11/1971 | David |
| 3,634,028 | A | 1/1972 | Hohne |
| 3,790,659 | A | 2/1974 | Storp et al. |
| 3,876,505 | A | 4/1975 | Stoneburner |
| 3,892,580 | A | 7/1975 | Messing |
| 3,977,901 | A | 8/1976 | Buzzelli |
| 4,082,694 | A | 4/1978 | Wennerberg et al. |
| 4,159,913 | A | 7/1979 | Birchall et al. |
| 4,198,382 | A | 4/1980 | Matsui |
| 4,543,341 | A | 9/1985 | Barringer et al. |
| 4,580,404 | A | 4/1986 | Pez et al. |
| 4,769,197 | A | 9/1988 | Kromrey |
| 4,843,015 | A | 6/1989 | Grubbs, Jr. et al. |
| 4,862,328 | A | 8/1989 | Morimoto et al. |
| 4,873,218 | A | 10/1989 | Pekala |
| 4,954,469 | A | 9/1990 | Robinson |
| 4,997,804 | A | 3/1991 | Pekala |
| 4,999,330 | A | 3/1991 | Bose et al. |
| 5,061,416 | A | 10/1991 | Willkens et al. |
| 5,093,216 | A | 3/1992 | Azuma et al. |
| 5,260,855 | A | 11/1993 | Kaschmitter et al. |
| 5,294,498 | A | 3/1994 | Omaru et al. |
| 5,416,056 | A | 5/1995 | Baker |
| 5,420,168 | A | 5/1995 | Mayer et al. |

(Continued)

FOREIGN PATENT DOCUMENTS

| CA | 2176452 A1 | 11/1997 |
| CN | 1762900 A | 4/2006 |

(Continued)

OTHER PUBLICATIONS

"Chemical Basics of Polymer Insulation Materials: 3.6 Implementation Method of Stepwise Polymerization," in Changming Li (eds.), *HITP Harbin Institute of Technology Press*, 2007, pp. 73 (With English Translation) (4 Pages).

(Continued)

*Primary Examiner* — Stuart L Hendrickson
(74) *Attorney, Agent, or Firm* — Seed IP Law Group LLP

(57) ABSTRACT

The present application is generally directed to gas storage materials such as activated carbon comprising enhanced gas adsorption properties. The gas storage materials find utility in any number of gas storage applications. Methods for making the gas storage materials are also disclosed.

36 Claims, 8 Drawing Sheets

(56) References Cited

U.S. PATENT DOCUMENTS

| | | |
|---|---|---|
| 5,465,603 A | 11/1995 | Anthony et al. |
| 5,508,341 A | 4/1996 | Mayer et al. |
| 5,529,971 A | 6/1996 | Kaschmitter et al. |
| 5,614,460 A | 3/1997 | Schwarz et al. |
| 5,626,637 A | 5/1997 | Baker |
| 5,626,977 A | 5/1997 | Mayer et al. |
| 5,670,571 A | 9/1997 | Gabrielson et al. |
| 5,674,642 A | 10/1997 | Le et al. |
| 5,710,092 A | 1/1998 | Baker |
| 5,726,118 A | 3/1998 | Ivey et al. |
| 5,744,258 A | 4/1998 | Bai et al. |
| 5,789,338 A | 8/1998 | Kaschmitter et al. |
| 5,834,138 A | 11/1998 | Yamada et al. |
| 5,858,486 A | 1/1999 | Metter et al. |
| 5,882,621 A | 3/1999 | Doddapaneni et al. |
| 5,891,822 A | 4/1999 | Oyama et al. |
| 5,908,896 A | 6/1999 | Mayer et al. |
| 5,945,084 A | 8/1999 | Droege |
| 5,965,483 A | 10/1999 | Baker et al. |
| 6,006,797 A | 12/1999 | Bulow et al. |
| 6,064,560 A | 5/2000 | Hirahara et al. |
| 6,069,107 A | 5/2000 | Kuznetsov et al. |
| 6,072,693 A | 6/2000 | Tsushima et al. |
| 6,096,456 A | 8/2000 | Takeuchi et al. |
| 6,117,585 A | 9/2000 | Anani et al. |
| 6,147,213 A | 11/2000 | Poli et al. |
| 6,153,562 A | 11/2000 | Villar et al. |
| 6,205,016 B1 | 3/2001 | Niu |
| 6,225,257 B1 | 5/2001 | Putyera et al. |
| 6,242,127 B1 | 6/2001 | Paik et al. |
| 6,268,081 B1 | 7/2001 | Clough |
| 6,309,446 B1 | 10/2001 | Nakanoya et al. |
| 6,310,762 B1 | 10/2001 | Okamura et al. |
| 6,339,528 B1 | 1/2002 | Lee et al. |
| 6,509,119 B1 | 1/2003 | Kobayashi et al. |
| 6,574,092 B2 | 6/2003 | Sato et al. |
| 6,592,838 B1 | 7/2003 | Nomoto et al. |
| 6,631,072 B1 | 10/2003 | Paul et al. |
| 6,631,073 B1 | 10/2003 | Sakata et al. |
| 6,697,249 B2 | 2/2004 | Maletin et al. |
| 6,764,667 B1 | 7/2004 | Steiner, III |
| 6,815,105 B2 | 11/2004 | Cooper et al. |
| 6,865,068 B1 | 3/2005 | Murakami et al. |
| 7,245,478 B2 | 7/2007 | Zhong et al. |
| 7,419,649 B2 | 9/2008 | Lundquist et al. |
| 7,582,902 B2 | 9/2009 | Tano et al. |
| 7,626,804 B2 | 12/2009 | Yoshio et al. |
| 7,722,991 B2 | 5/2010 | Zhang et al. |
| 7,723,262 B2 | 5/2010 | Feaver et al. |
| 7,754,178 B2 | 7/2010 | Tano et al. |
| 7,785,495 B2 | 8/2010 | Kikuchi et al. |
| 7,816,413 B2 | 10/2010 | Feaver et al. |
| 7,835,136 B2 | 11/2010 | Feaver et al. |
| 8,158,556 B2 | 4/2012 | Feaver et al. |
| 8,293,818 B2 | 10/2012 | Costantino et al. |
| 8,329,252 B2 | 12/2012 | Makarov et al. |
| 8,361,659 B2 | 1/2013 | Richard |
| 8,366,979 B2 | 2/2013 | Dai et al. |
| 8,404,384 B2 | 3/2013 | Feaver et al. |
| 8,411,415 B2 | 4/2013 | Yoshinaga et al. |
| 8,467,170 B2 | 6/2013 | Feaver et al. |
| 8,480,930 B2 | 7/2013 | Suh et al. |
| 8,482,900 B2 | 7/2013 | Gadkaree et al. |
| 8,580,870 B2 | 11/2013 | Costantino et al. |
| 8,654,507 B2 | 2/2014 | Costantino et al. |
| 8,691,177 B2 | 4/2014 | Pfeifer et al. |
| 8,709,971 B2 | 4/2014 | Feaver et al. |
| 8,734,991 B2 | 5/2014 | Takano et al. |
| 8,797,717 B2 | 8/2014 | Feaver et al. |
| 8,809,230 B2 | 8/2014 | Worsley et al. |
| 8,906,978 B2 | 12/2014 | Costantino et al. |
| 8,916,296 B2 | 12/2014 | Feaver et al. |
| 8,999,202 B2 | 4/2015 | Mulik et al. |
| 9,005,812 B2 | 4/2015 | Ma et al. |
| 9,067,848 B2 | 6/2015 | Stadie et al. |
| 9,112,230 B2 | 8/2015 | Feaver et al. |
| 9,133,295 B2 | 9/2015 | Qureshi et al. |
| 9,133,337 B2 | 9/2015 | Ludvik et al. |
| 9,136,064 B2 | 9/2015 | Gadkaree et al. |
| 9,186,174 B2 | 11/2015 | Krishnan |
| 9,269,502 B2 | 2/2016 | Chang et al. |
| 9,287,556 B2 | 3/2016 | Neumann et al. |
| 9,409,777 B2 | 8/2016 | Geramita et al. |
| 9,412,523 B2 | 8/2016 | Costantino et al. |
| 9,464,162 B2 | 10/2016 | Kron et al. |
| 9,580,321 B2 | 2/2017 | Feaver et al. |
| 9,666,860 B2 | 5/2017 | Lam et al. |
| 9,680,159 B2 | 6/2017 | Feaver et al. |
| 9,714,172 B2 | 7/2017 | Geramita et al. |
| 9,985,289 B2 | 5/2018 | Costantino et al. |
| 10,049,824 B2 | 8/2018 | Tsukada et al. |
| 10,141,122 B2 | 11/2018 | Feaver et al. |
| 10,173,900 B2 | 1/2019 | Ludvik et al. |
| 10,195,583 B2 * | 2/2019 | Costantino ......... B01J 20/28011 |
| 10,273,328 B2 | 4/2019 | Kron et al. |
| 10,287,170 B2 | 5/2019 | Feaver et al. |
| 10,454,094 B2 | 10/2019 | Xia et al. |
| 10,490,358 B2 | 11/2019 | Feaver et al. |
| 10,522,836 B2 | 12/2019 | Thompkins et al. |
| 10,600,581 B2 | 3/2020 | Feaver et al. |
| 10,714,744 B2 | 7/2020 | Sakshaug et al. |
| 10,814,304 B2 * | 10/2020 | Costantino ......... B01J 20/28073 |
| 11,401,363 B2 | 8/2022 | Geramita et al. |
| 11,495,793 B2 | 11/2022 | Sakshaug et al. |
| 2001/0002086 A1 | 5/2001 | Webb |
| 2002/0031706 A1 | 3/2002 | Dasgupta et al. |
| 2002/0031710 A1 | 3/2002 | Kezuka et al. |
| 2002/0036885 A1 | 3/2002 | Lee et al. |
| 2002/0075627 A1 | 6/2002 | Shinozaki et al. |
| 2002/0104474 A1 | 8/2002 | Wakamatsu et al. |
| 2002/0114126 A1 | 8/2002 | Hirahara et al. |
| 2002/0122985 A1 | 9/2002 | Sato et al. |
| 2002/0168314 A1 | 11/2002 | Roemmler |
| 2002/0172637 A1 | 11/2002 | Chesneau et al. |
| 2003/0012722 A1 | 1/2003 | Liu |
| 2003/0013606 A1 | 1/2003 | Hampden-Smith et al. |
| 2003/0064564 A1 | 4/2003 | Lin |
| 2003/0108785 A1 | 6/2003 | Wu et al. |
| 2003/0170548 A1 | 9/2003 | Otsuki et al. |
| 2004/0010090 A1 | 1/2004 | Chino et al. |
| 2004/0106040 A1 | 6/2004 | Fukuoka et al. |
| 2004/0132845 A1 | 7/2004 | Rhine et al. |
| 2004/0141963 A1 | 7/2004 | Umekawa et al. |
| 2004/0180264 A1 | 9/2004 | Honbo et al. |
| 2004/0241237 A1 | 12/2004 | Pirard et al. |
| 2004/0248730 A1 | 12/2004 | Kim et al. |
| 2004/0248790 A1 | 12/2004 | Hinuma et al. |
| 2005/0014643 A1 | 1/2005 | Lini et al. |
| 2005/0041370 A1 | 2/2005 | Wilk et al. |
| 2005/0058589 A1 | 3/2005 | Lundquist et al. |
| 2005/0058907 A1 | 3/2005 | Kurihara et al. |
| 2005/0079349 A1 | 4/2005 | Hampden-Smith et al. |
| 2005/0079359 A1 | 4/2005 | Fujita et al. |
| 2005/0135993 A1 | 6/2005 | Xu et al. |
| 2005/0153130 A1 | 7/2005 | Long et al. |
| 2005/0196336 A1 | 9/2005 | Chatterjee et al. |
| 2005/0221981 A1 | 10/2005 | Wagh et al. |
| 2005/0233195 A1 | 10/2005 | Arnold et al. |
| 2005/0250011 A1 | 11/2005 | Mitchell et al. |
| 2005/0253220 A1 | 11/2005 | Lin et al. |
| 2005/0266990 A1 | 12/2005 | Iwasaki et al. |
| 2005/0282062 A1 | 12/2005 | Manako et al. |
| 2006/0008408 A1 | 1/2006 | Ho Yoon et al. |
| 2006/0057355 A1 | 3/2006 | Suzuki et al. |
| 2006/0079587 A1 | 4/2006 | Albert et al. |
| 2006/0093915 A1 | 5/2006 | Lundquist et al. |
| 2006/0223965 A1 | 10/2006 | Trifu |
| 2006/0240979 A1 | 10/2006 | Hirahara et al. |
| 2007/0002523 A1 | 1/2007 | Ando et al. |
| 2007/0008677 A1 | 1/2007 | Zhong et al. |
| 2007/0048605 A1 | 3/2007 | Pez et al. |
| 2007/0104981 A1 | 5/2007 | Lam et al. |
| 2007/0142222 A1 | 6/2007 | Erkey et al. |
| 2007/0166602 A1 | 7/2007 | Burchardt |

(56) References Cited

U.S. PATENT DOCUMENTS

| | | |
|---|---|---|
| 2008/0011986 A1 | 1/2008 | Yamakawa et al. |
| 2008/0044726 A1 | 2/2008 | Feng et al. |
| 2008/0107804 A1 | 5/2008 | Kondo |
| 2008/0112876 A1 | 5/2008 | Dailey |
| 2008/0132632 A1 | 6/2008 | Schiraldi et al. |
| 2008/0145757 A1 | 6/2008 | Mah et al. |
| 2008/0145761 A1 | 6/2008 | Petrat et al. |
| 2008/0201925 A1 | 8/2008 | Zhong et al. |
| 2008/0204973 A1 | 8/2008 | Zhong et al. |
| 2008/0206638 A1 | 8/2008 | Takahashi et al. |
| 2008/0241640 A1 | 10/2008 | Rajeshwar et al. |
| 2008/0268297 A1 | 10/2008 | Quayle et al. |
| 2008/0277115 A1 | 11/2008 | Rediger et al. |
| 2008/0293911 A1 | 11/2008 | Qureshi et al. |
| 2008/0297981 A1 | 12/2008 | Endo et al. |
| 2008/0299456 A1 | 12/2008 | Shiga et al. |
| 2009/0035344 A1 | 2/2009 | Thomas et al. |
| 2009/0053594 A1 | 2/2009 | Johnson et al. |
| 2009/0097189 A1 | 4/2009 | Tasaki et al. |
| 2009/0104509 A1 | 4/2009 | Kwak et al. |
| 2009/0104530 A1 | 4/2009 | Shizuka et al. |
| 2009/0114544 A1 | 5/2009 | Rousseau et al. |
| 2009/0117466 A1 | 5/2009 | Zhamu et al. |
| 2009/0145482 A1 | 6/2009 | Mitzi et al. |
| 2009/0185327 A1 | 7/2009 | Seymour |
| 2009/0213529 A1 | 8/2009 | Gogotsi et al. |
| 2009/0253248 A1 | 10/2009 | Sun et al. |
| 2009/0286160 A1 | 11/2009 | Kozono et al. |
| 2009/0305131 A1 | 12/2009 | Kumar et al. |
| 2010/0008021 A1 | 1/2010 | Hu et al. |
| 2010/0047671 A1 | 2/2010 | Chiang et al. |
| 2010/0051881 A1 | 3/2010 | Ahn et al. |
| 2010/0092370 A1 | 4/2010 | Zhang et al. |
| 2010/0097741 A1 | 4/2010 | Zhong et al. |
| 2010/0098615 A1 | 4/2010 | Tennison et al. |
| 2010/0110613 A1 | 5/2010 | Zhong et al. |
| 2010/0163791 A1 | 7/2010 | Fukui et al. |
| 2010/0213104 A1 | 8/2010 | Hughes et al. |
| 2010/0215563 A1 | 8/2010 | Yambayashi |
| 2010/0279172 A1 | 11/2010 | Hwang et al. |
| 2010/0288970 A1 | 11/2010 | Watanabe et al. |
| 2010/0310941 A1 | 12/2010 | Kumta et al. |
| 2010/0316907 A1 | 12/2010 | Yamamoto et al. |
| 2011/0053765 A1 | 3/2011 | Feaver et al. |
| 2011/0111284 A1 | 5/2011 | Maeshima et al. |
| 2011/0159375 A1 | 6/2011 | Feaver et al. |
| 2011/0177393 A1 | 7/2011 | Park et al. |
| 2011/0200848 A1 | 8/2011 | Chiang et al. |
| 2011/0261501 A1 | 10/2011 | Gadkaree et al. |
| 2011/0281180 A1 | 11/2011 | Kim et al. |
| 2011/0287189 A1 | 11/2011 | Shembel et al. |
| 2011/0300447 A1 | 12/2011 | Archer |
| 2011/0311873 A1 | 12/2011 | Schulz et al. |
| 2012/0045685 A1 | 2/2012 | Seki et al. |
| 2012/0129049 A1 | 5/2012 | Rayner |
| 2012/0156493 A1 | 6/2012 | Maisels et al. |
| 2012/0156567 A1 | 6/2012 | Ayme-Perrot et al. |
| 2012/0183856 A1 | 7/2012 | Cui et al. |
| 2012/0241691 A1 | 9/2012 | Soneda et al. |
| 2012/0251876 A1 | 10/2012 | Jagannathan |
| 2012/0262127 A1 | 10/2012 | Feaver et al. |
| 2012/0264020 A1 | 10/2012 | Burton et al. |
| 2012/0305651 A1 | 12/2012 | Anderson et al. |
| 2012/0308870 A1 | 12/2012 | Okuda et al. |
| 2012/0321959 A1 | 12/2012 | Yushin et al. |
| 2013/0082213 A1 | 4/2013 | Duncan et al. |
| 2013/0169238 A1 | 7/2013 | Rojeski |
| 2013/0189472 A1 | 7/2013 | Takaoka |
| 2013/0189575 A1 | 7/2013 | Anguchamy et al. |
| 2013/0196158 A1 | 8/2013 | Yoshida et al. |
| 2013/0244862 A1 | 9/2013 | Ivanovici et al. |
| 2013/0252082 A1 | 9/2013 | Thompkins et al. |
| 2013/0295462 A1 | 11/2013 | Atanassova et al. |
| 2013/0337334 A1 | 12/2013 | Tao et al. |
| 2013/0344363 A1 | 12/2013 | Upadhyaya |
| 2013/0344391 A1 | 12/2013 | Yushin et al. |
| 2014/0038042 A1 | 2/2014 | Rios et al. |
| 2014/0057179 A1 | 2/2014 | Yushin et al. |
| 2014/0170482 A1 | 6/2014 | Park et al. |
| 2014/0272592 A1 | 9/2014 | Thompkins et al. |
| 2014/0287317 A1 | 9/2014 | Tiquet et al. |
| 2014/0302396 A1 | 10/2014 | Lu et al. |
| 2014/0335410 A1 | 11/2014 | Loveridge et al. |
| 2015/0037249 A1 | 2/2015 | Fu |
| 2015/0087731 A1 | 3/2015 | Dong et al. |
| 2015/0162603 A1 | 6/2015 | Yushin et al. |
| 2015/0238917 A1 | 8/2015 | Mulik et al. |
| 2015/0255781 A1 | 9/2015 | Hashimoto |
| 2016/0010250 A1 | 1/2016 | Taninaka et al. |
| 2016/0039970 A1 | 2/2016 | Kron et al. |
| 2016/0133394 A1 | 5/2016 | Sakshaug et al. |
| 2016/0344030 A1 | 11/2016 | Sakshaug et al. |
| 2016/0372750 A1 | 12/2016 | Chang et al. |
| 2017/0316888 A1 | 11/2017 | Geramita et al. |
| 2018/0097240 A1 | 4/2018 | Feaver et al. |
| 2019/0103608 A1 | 4/2019 | Costantino et al. |
| 2020/0048098 A1 | 2/2020 | Feaver et al. |
| 2020/0259178 A1 | 8/2020 | Chang et al. |
| 2020/0280070 A1 | 9/2020 | Sakshaug et al. |
| 2022/0389146 A1 | 12/2022 | Geramita et al. |
| 2023/0016325 A1 | 1/2023 | Geramita et al. |
| 2023/0022154 A1 | 1/2023 | Geramita et al. |

FOREIGN PATENT DOCUMENTS

| | | |
|---|---|---|
| CN | 1877888 A | 12/2006 |
| CN | 1986401 A | 6/2007 |
| CN | 101284665 A | 10/2008 |
| CN | 101292389 A | 10/2008 |
| CN | 101318648 A | 12/2008 |
| CN | 101604743 A | 12/2009 |
| CN | 101292389 B | 9/2010 |
| CN | 101969120 A | 2/2011 |
| CN | 102214817 A | 10/2011 |
| CN | 102623680 A | 8/2012 |
| CN | 102820455 A | 12/2012 |
| CN | 103094528 A | 5/2013 |
| CN | 103456929 A | 12/2013 |
| CN | 102509781 B | 11/2015 |
| EP | 0126191 A2 | 11/1984 |
| EP | 0649815 A1 | 4/1995 |
| EP | 0861804 A1 | 9/1998 |
| EP | 0891943 A1 | 1/1999 |
| EP | 1049116 A1 | 11/2000 |
| EP | 1052716 A2 | 11/2000 |
| EP | 1514859 A2 | 3/2005 |
| EP | 2117068 A1 | 11/2009 |
| EP | 2330676 A1 | 6/2011 |
| EP | 2983186 A1 | 2/2016 |
| JP | H02300222 A | 12/1990 |
| JP | H0390615 A | 4/1991 |
| JP | H03137010 A | 6/1991 |
| JP | H0459806 A | 2/1992 |
| JP | H04139174 A | 5/1992 |
| JP | H05117493 A | 5/1993 |
| JP | H05156121 A | 6/1993 |
| JP | H05311512 A | 11/1993 |
| JP | H05320955 A | 12/1993 |
| JP | H0859919 A | 3/1996 |
| JP | H08112539 A | 5/1996 |
| JP | H0963905 A | 3/1997 |
| JP | H09275042 A | 10/1997 |
| JP | H10297912 A | 11/1998 |
| JP | 2001089119 A | 4/2001 |
| JP | 2001278609 A | 10/2001 |
| JP | 2003303588 A | 10/2003 |
| JP | 2004067498 A | 3/2004 |
| JP | 2004203715 A | 7/2004 |
| JP | 2004221332 A | 8/2004 |
| JP | 2004315283 A | 11/2004 |
| JP | 2005132696 A | 5/2005 |
| JP | 2005136397 A | 5/2005 |
| JP | 2005187320 A | 7/2005 |
| JP | 2006117475 A | 5/2006 |

(56) References Cited

FOREIGN PATENT DOCUMENTS

| | | |
|---|---|---|
| JP | 2006248848 A | 9/2006 |
| JP | 2006264993 A | 10/2006 |
| JP | 2007039289 A | 2/2007 |
| JP | 2007115749 A | 5/2007 |
| JP | 2008007387 A | 1/2008 |
| JP | 2008008539 A | 1/2008 |
| JP | 2008094925 A | 4/2008 |
| JP | 2009259803 A | 11/2009 |
| JP | 5339107 B1 | 11/2013 |
| JP | 2016027222 A | 2/2016 |
| KR | 10-2004-0080010 A | 9/2004 |
| KR | 10-2007-0030881 A | 3/2007 |
| KR | 10-2014-0112451 A | 9/2014 |
| WO | 9501165 A1 | 1/1995 |
| WO | 0239468 A2 | 5/2002 |
| WO | 2004087285 A1 | 10/2004 |
| WO | 2004099073 A2 | 11/2004 |
| WO | 2005043653 A1 | 5/2005 |
| WO | 2009032104 A2 | 3/2009 |
| WO | 2010138760 A2 | 12/2010 |
| WO | 2011157013 A1 | 12/2011 |
| WO | 2014133070 A1 | 9/2014 |

OTHER PUBLICATIONS

Abraham et al., "A Polymer Electrolyte-Based Rechargeable Lithium/Oxygen Battery," *J. Electrochem. Soc.* 143(1):1-5, Jan. 1996.
Abánades et al., "Experimental Analysis of Direct Thermal Methane Cracking," *International Journal of Hydrogen Energy* 36(20):12877-12886, 2011.
Alcañiz-Monge et al., "Methane Storage in Activated Carbon Fibres," *Carbon* 35(2):291-297, 1997.
Alias et al., "Silicon/graphite nanocomposite electrodes prepared by low pressure chemical vapor deposition," *Journal of Power Sources* 174:900-904, 2007.
Andreasen et al., "Ueber die Beziehung zwischen Kornabstufung und Zwischenraum in Produkten aus losen Körnern (mit einigen Experimenten)," *Kolloid-Zeitschrift* 50(3):217-228, Mar. 1930, with translation of summary. (17 pages).
Babić et al., "Carbon cryogel as support of platinum nano-sized electrocatalyst for the hydrogen oxidation reaction," *Electrochimica Acta* 51:3820-3826, 2006.
Babić et al., "Characterization of carbon cryogel synthesized by sol-gel polycondensation and freeze-drying," *Carbon* 42:2617-2624, 2004.
Babić et al., "Characterization of carbon cryogels synthesized by sol-gel polycondensation," *J. Serb. Chem. Soc.* 70(1):21-31, 2005.
Barbieri et al., "Capacitance limits of high surface area activated carbons for double layer capacitors," *Carbon* 43:1303-1310, 2005.
Barton et al., "Tailored Porous Materials," *Chem. Mater.* 11:2633-2656, 1999.
Beattie et al., "High-Capacity Lithium-Air Cathodes," *J. Electrochem. Soc.* 156(1):A44-A47, 2009.
Besenhard, "Handbook of battery materials," Weinheim, Wiley—VCH, New York, 398-401, Dec. 31, 1999.
Bock et al., "Structural Investigation of Resorcinol Formaldehyde and Carbon Aerogels Using SAXS and BET," *Journal of Porous Materials* 4:287-294, 1997.
Buiel et al., "Li-insertion in hard carbon anode materials for Li-ion batteries," *Electrochimica Acta* 45:121-130, 1999.
Burchell et al., "Low Pressure Storage of Natural Gas for Vehicular Applications," *The Engineering Society for Advancing Mobility Land Sea Air and Space, Government/Industry Meeting*, Washington D.C., Jun. 19-21, 2000, 7 pages.
Cao et al., "Li-ion capacitors with carbon cathode and hard carbon/stabilized lithium metal powder anode electrodes," *Journal of Power Sources* 213:180-185, Apr. 2012.
Chmiola et al., "Anomalous Increase in Carbon Capacitance at Pore Sizes Less Than 1 Nanometer," *Science* 313:1760-1763, Sep. 22, 2006.

Conway et al., "Partial Molal Volumes of Tetraalkylammonium Halides and Assignment of Individual Ionic Contributions," *Trans. Faraday Soc.* 62:2738-2749, 1966.
Coppey et al., "Fluidized Bed Chemical Vapor Deposition of Silicon on Carbon Nanotubes for Li-Ion Batteries," *Journal of Nanoscience and Nanotechnology* 11(9):8392-8395, 2011.
Czakkel et al., "Influence of drying on the morphology of resorcinol-formaldehyde-based carbon gels," *Microporous and Mesoporous Materials* 86:124-133, 2005.
De Lange et al., "Adsorptive characterization of porous solids: Error analysis guides the way," *Microporous and Mesoporous Materials* 200:199-215, Sep. 2014.
Ding et al., "How Conductivities and Viscosities of PC-DEC and PC-EC Solutions of LiBF4, LiPF6, LiBOB, Et4NBF4, and Et4NBF6 Differ and Why," *Journal of the Electrochemical Society* 151(12):A2007-A2015, 2004.
Dinger et al., "Particle Packing III—Discrete versus Continuous Particle Sizes," *Interceram* 41(5):332-334, 1992.
Dinger et al., "Particle Packing IV—Computer Modelling of Particle Packing Phenomena," *Interceram* 42(3):150-152, 1993.
Débart et al., "α-MnO2 Nanowires: A Catalyst for the O2 Electrode in Rechargeable Lithium Batteries," *Agnew. Chem. Int. Ed.* 47:4521-4524, 2008.
Eikerling et al., "Optimized Structure of Nanoporous Carbon-Based Double-Layer Capacitors," *Journal of the Electrochemical Society* 152(1):E24-E33, 2005.
Endo et al., "Morphology and organic EDLC applications of chemically activated AR-resin-based carbons," *Carbon* 40:2613-2626, 2002.
Feaver et al., "Activated carbon cryogels for low pressure methane storage," *Carbon* 44:590-593, 2006.
Fraas, "Using vibrations in fluidized beds for processes that do not require a high flow rate of sweep gas, the complex-mode vibration fluidized bed offers lower power needs, attrition rates, and elutriation rates than gas-fluidized beds or rotary kilns," *Mechanical Engineering*:76-79, Jan. 7, 1998.
Furnas, "Grading Aggregates I—Mathematical Relations for Beds of Broken Solids of Maximum Density," *Industrial and Engineering Chemistry* 23(9):1052-1058, 1931.
Hahn et al., "A dilatometric study of the voltage limitation of carbonaceous electrodes in aprotic EDLC type electrolytes by charge-induced strain," *Carbon* 44:2523-2533, 2006.
Hasegawa et al., "Preparation of carbon gel microspheres containing silicon powder for lithium ion battery anodes," *Carbon* 42:2573-2579, 2004.
Hirscher et al., "Are carbon nanostructures an efficient hydrogen storage medium?" *Journal of Alloys and Compounds* 356-357:433-437, 2003.
Hogness et al. "The Thermal Decomposition of Silane," *J. Am. Chem. Soc.* 58(1):108-112, 1936.
Hsieh et al., "Synthesis of mesoporous carbon composite and its electric double-layer formation behavior," *Microporous and Mesoporous Materials* 93:232-239, 2006.
Hu et al., "Effects of electrolytes and electrochemical pretreatments on the capacitive characteristics of activated carbon fabrics for supercapacitors," *Journal of Power Sources* 125:299-308, 2004.
Huang et al., "Nitrogen-containing mesoporous carbons prepared from melamine formaldehyde resins with CaC12 as a template," *J. Colloid Interface Sci.* 363(1):193-198, 2011.
Inomata et al., "Natural gas storage in activated carbon pellets without a binder," *Carbon* 40:87-93, 2002.
Job et al., "Carbon aerogels, cryogels and xerogels: Influence of the drying method on the textural properties of porous carbon materials," *Carbon* 43:2481-2494, 2005.
Job et al., "Highly dispersed platinum catalysts prepared by impregnation of texture-tailored carbon xerogels," *Journal of Catalysis* 240:160-171, 2006.
Job et al., "Synthesis of transition metal-doped carbon xerogels by solubilization of metal salts in resorcinol-formaldehyde aqueous solution," *Carbon* 42:3217-3227, 2004.
Katsaros et al., "Preparation and characterisation of gas selective microporous carbon membranes," *Microporous and Mesoporous Materials* 99:181-189, 2007.

(56) References Cited

OTHER PUBLICATIONS

Kim et al., "Adsorption of phenol and reactive dyes from aqueous solution on carbon cryogel microspheres with controlled porous structure," *Microporous and Mesoporous Materials* 96:191-196, 2006.
Kim et al., "Correlation between the capacitor performance and pore structure," *Tanso* 221:31-39, 2006 (English Abstract).
Kocklenberg et al., "Texture control of freeze-dried resorcinol-formaldehyde gels," *Journal of Non-Crystalline Solids* 225:8-13, 1998.
Kowalczyk et al., "Estimation of the pore-size distribution function from the nitrogen adsorption isotherm. Comparison of density functional theory and the method of Do and co-workers," *Carbon* 41:1113-1125, 2003.
Lozano-Castelló et al., "Influence of pore structure and surface chemistry on electric double layer capacitance in non-aqueous electrolyte," *Carbon* 41:1765-1775, 2003.
Lozano-Castelló et al., "Powdered Activated Carbons and Activated Carbon Fibers for Methane Storage: A Comparative Study," *Energy & Fuels* 16:1321-1328, 2002.
McEwen et al., "Nonaqueous Electrolytes and Novel Packaging Concepts for Electrochemical Capacitors," The 7th International Seminar on Double Layer capacitors and Similar Energy Storage Devices, Deerfield Beach, FL Dec. 8-10, 1997, 56 pages.
Miller, "Pulse Power Performance of Electrochemical Capacitors: Technical Status Of Present Commercial Devices," Proceedings of the 8th International Seminar on Double Layer Capacitors and Similar Energy Storage Devices, Deerfield Beach, Florida, Dec. 7-9, 1998, 9 pages.
Naoi et al., "Second generation 'nanohybrid supercapacitor': Evolution of capacitive energy storage devices," *Energy Environ. Sci.* 5:9363-9373, 2012.
Nishihara et al., "Preparation of resorcinol—formaldehyde carbon cryogel microhoneycombs," *Carbon* 42:899-901, 2004.
Ogasawara et al., "Rechargeable LI2O2 Electrode for Lithium Batteries," *Journal of the American Chemical Society* 128(4):1390-1393, 2006.
Otowa et al., "Production and adsorption characteristics of MAXSORB: High-surface-area active carbon," *Gas Separation and Purification* 7(4):241-245, 1993.
Pääkkö, "Long and entangled native cellulose I nanofibers allow flexible aerogels and hierarchically porous templates for functionalities," *Soft Matter* 4:2492-2499, 2008.
Pekala et al., "Aerogels derived from multifunctional organic monomers," *Journal of Non-Crystalline Solids* 145:90-98, 1992.
Pekala et al., "Structure of Organic Aerogels. 1. Morphology and Scaling," *Macromolecules* 26:5487-5493, 1993.
Pekala, "Organic aerogels from the polycondensation of resorcinol with formaldehyde," *Journal of Materials Science* 24:3221-3227, 1989.
Perrin et al., "Methane Storage within Dry and Wet Active Carbons: A Comparative Study," *Energy & Fuels* 17:1283-1291, 2003.
Pojanavaraphan et al., "Prevulcanized natural rubber latex/clay aerogel nanocomposites," *European Polymer Journal* 44:1968-1977, 2008.
Qu et al., "Studies of activated carbons used in double-layer capacitors," *Journal of Power Sources* 74:99-107, 1998.
Ravikovitch et al., "Unified Approach to Pore Size Characterization of Microporous Carbonaceous Materials from N2, Ar, and CO2 Adsorption Isotherms," *Langmuir* 16:2311-2320, 2000.
Read et al., "Oxygen Transport Properties of Organic Electrolytes and Performance of Lithium/Oxygen Battery," *J. Electrochem. Soc.* 150(10):A1351-A1356, 2003.
Read, "Characterization of the Lithium/Oxygen Organic Electrolyte Battery," *J. Electrochemical Soc.* 149(9):A1190-A1195, 2002.
Read, "Ether-Based Electrolytes for the Lithium/Oxygen Organic Electrolyte Battery," *J. Electrochem. Soc.* 153(1):A96-A100, 2006.
Reichenauer et al., "Microporosity in carbon aerogels," *Journal of Non-Crystalline Solids* 225:210-214, 1998.
Salitra et al., "Carbon Electrodes for Double-Layer Capacitors I. Relations Between Ion and Pore Dimensions," *Journal of the Electrochemical Society* 147(7):2486-2493, 2000.
Setoyama et al., "Simulation Study on the Relationship Between A High Resolution $\alpha_s$-Plot and the Pore Size Distribution for Activated Carbon," *Carbon* 36(10):1459-1467, 1998.
Simon et al., "Materials for electrochemical capacitors," *Nature Materials* 7:845-854, Nov. 2008.
Sivakkumar et al., "Evaluation of Lithium-ion capacitors assembled with pre-lithiated graphite anode and activated carbon cathode," *Electrochimica Acta* 65:280-287, Jan. 2012.
Tamon et al., "Influence of freeze-drying conditions on the mesoporosity of organic gels as carbon precursors," *Carbon* 38:1099-1105, 2000.
Tamon et al., "Preparation of mesoporous carbon by freeze drying," *Carbon* 37:2049-2055, 1999.
Tonanon et al., "Influence of surfactants on porous properties of carbon cryogels prepared by sol-gel polycondensation of resorcinol and formaldehyde," *Carbon* 41:2981-2990, 2003.
Toyo Tanso Carbon Products, "Special Graphite and Compound Material Products," Toyo Tanso Co., Ltd. Catalog published 2008.
Toyo Tanso, "Graphite Applications," Toyo Tanso Co., Ltd. Catalog published 1998. (Machine Translation Attached).
Toyo Tanso, "Isotropic Graphite Engineering Data," Toyo Tanso Co., Ltd. Catalog published 1994.
Toyo Tanso, "Isotropic Graphite Technical Data," Toyo Tanso Co., Ltd. Catalog published 1997.
Ue, "Mobility and Ionic Association of Lithium and Quaternary Ammonium Salts in Propylene Carbonate and $\gamma$-Butyrolactone," *J. Electrochem. Soc.* 141(12):3336-3342, Dec. 1994.
Wei et al., "A novel electrode material for electric double-layer capacitors," *Journal of Power Sources* 141:386-391, 2005.
Williford et al., "Air electrode design for sustained high power operation of Li/air batteries," *Journal of Power Sources* 194:1164-1170, 2009.
Woo et al., "Silicon Embedded Nanoporous Carbon Composite for the Anode of Li Ion Batteries," *Journal of the Electrochemical Society* 159(8):A1273-A1277, 2012.
Wu et al., "Fabrication and nano-structure control of carbon aerogels via a microemulsion-templated sol-gel polymerization method," *Carbon* 44:675-681, 2006.
Xiang et al., "Beneficial effects of activated carbon additives on the performance of negative lead-acid battery electrode for high-rate partial-state-of-charge operation," *Journal of Power Sources* 241:150-158, 2013.
Xie et al., "Pore size control of Pitch-based activated carbon fibers by pyrolytic deposition of propylene," *Applied Surface Science* 250:152-160, 2005.
Xu et al., "Comparison of sizing small particles using different technologies," *Powder Technology* 132:145-153, 2003.
Xu et al., "Optimization of Nonaqueous Electrolytes for Primary Lithium/Air Batteries Operated in Ambient Environment," *Journal of the Electrochemical Society* 156(10):A773-A779, 2009.
Xu et al., "Synthesis of mesoporous carbon and its adsorption property to biomolecules," *Microporous and Mesoporous Materials* 115:461-468, 2008.
Yamamoto et al., "Control of mesoporosity of carbon gels prepared by sol-gel polycondensation and freeze drying," *Journal of Non-Crystalline Solids* 288:46-55, 2001.
Yamamoto et al., "Porous properties of carbon gel microspheres as adsorbents for gas separation," *Carbon* 42:1671-1676, 2004.
Yamamoto et al., "Preparation and characterization of carbon cryogel microspheres," *Carbon* 40:1345-1351, 2002.
Yang et al., "Preparation of highly microporous and mesoporous carbon from the mesophase pitch and its carbon foams with KOH," *Carbon* 42:1872-1875, 2004.
Zhang et al., "Discharge characteristic of non-aqueous electrolyte Li/O2 battery," *Journal of Power Sources* 195:1235-1240, 2010.
Zhao et al., "Facile Synthesis for LiFePO4 Nanospheres in Tridmensional Porous Carbon Framework for Lithium Ion Batteries," *The Journal of Physical Chemistry* 115:2888-2894, 2011.

\* cited by examiner

Figure 1. Schematic of apparatus to measure methane adsorption.
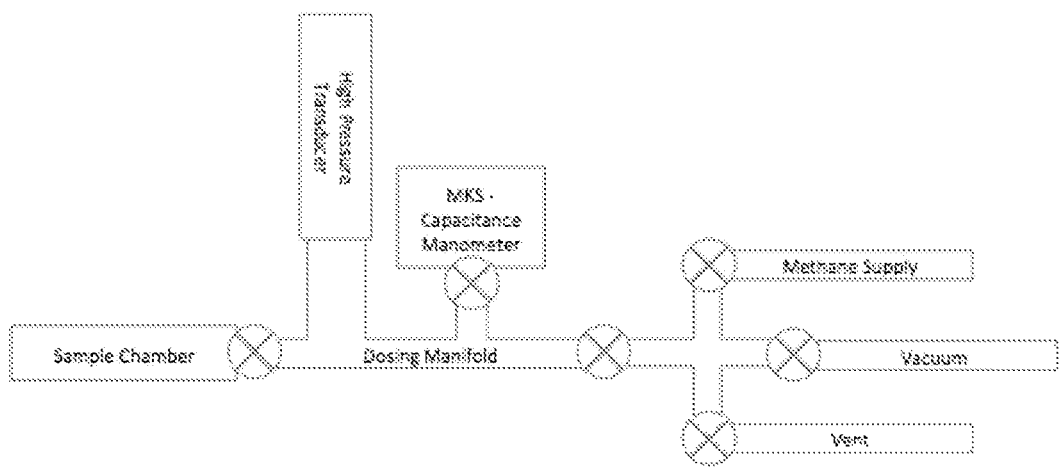

Figure 2. Pore distribution for carbon of Example 8.
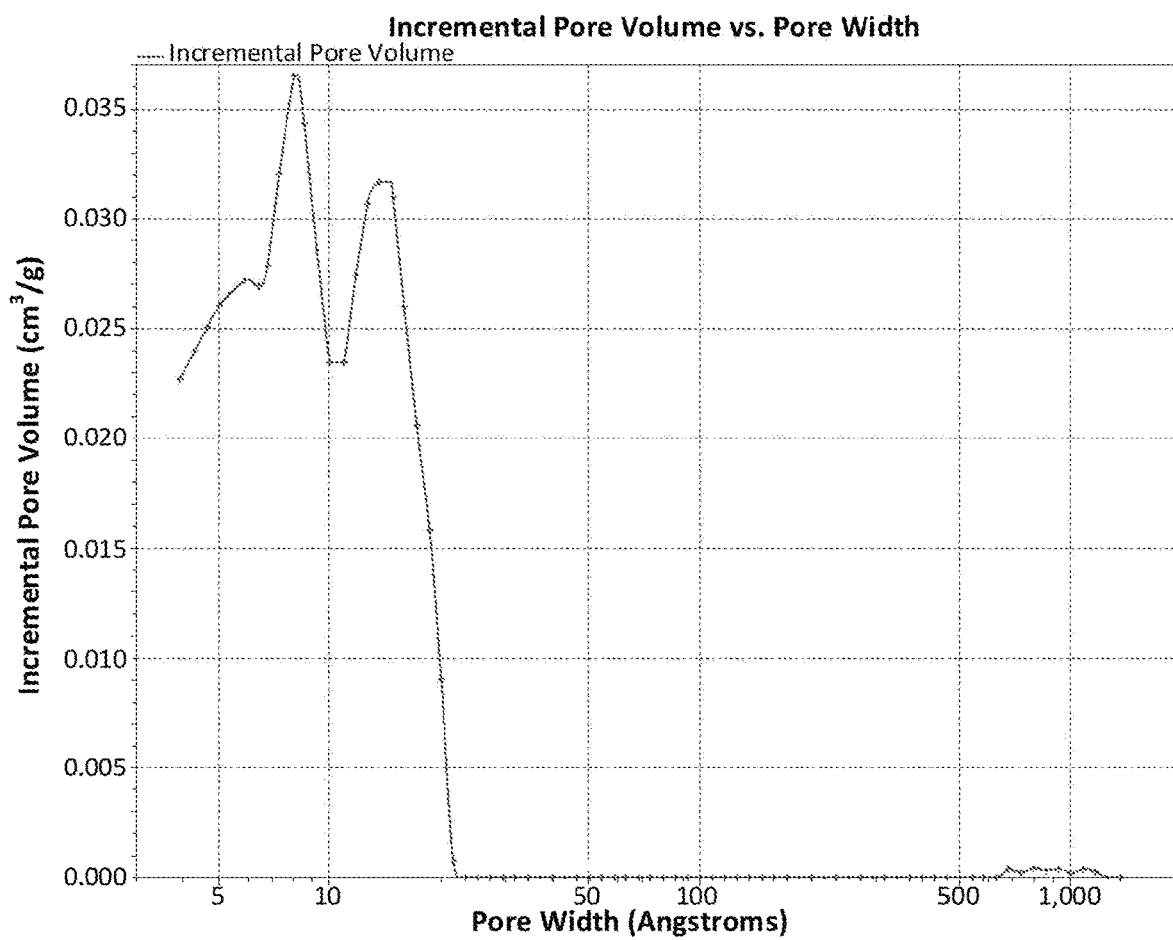

Figure 3. Particle size distribution for composite carbon of Example 8.
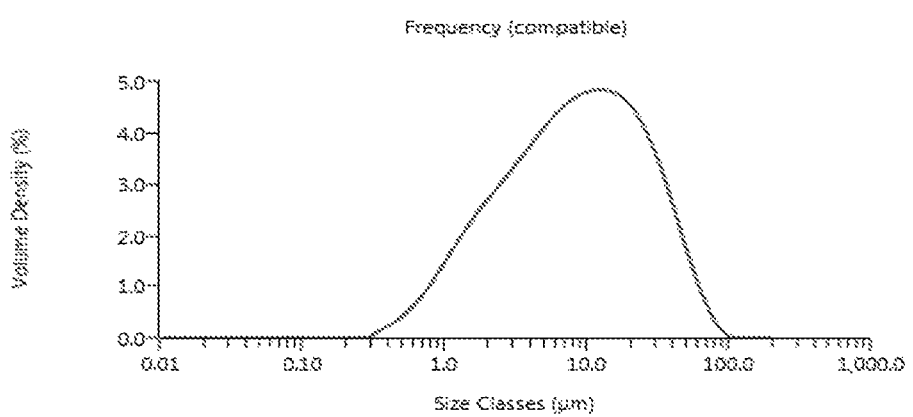

Figure 4. Maximum theoretical V/V as a function of pore volume for various carbon samples
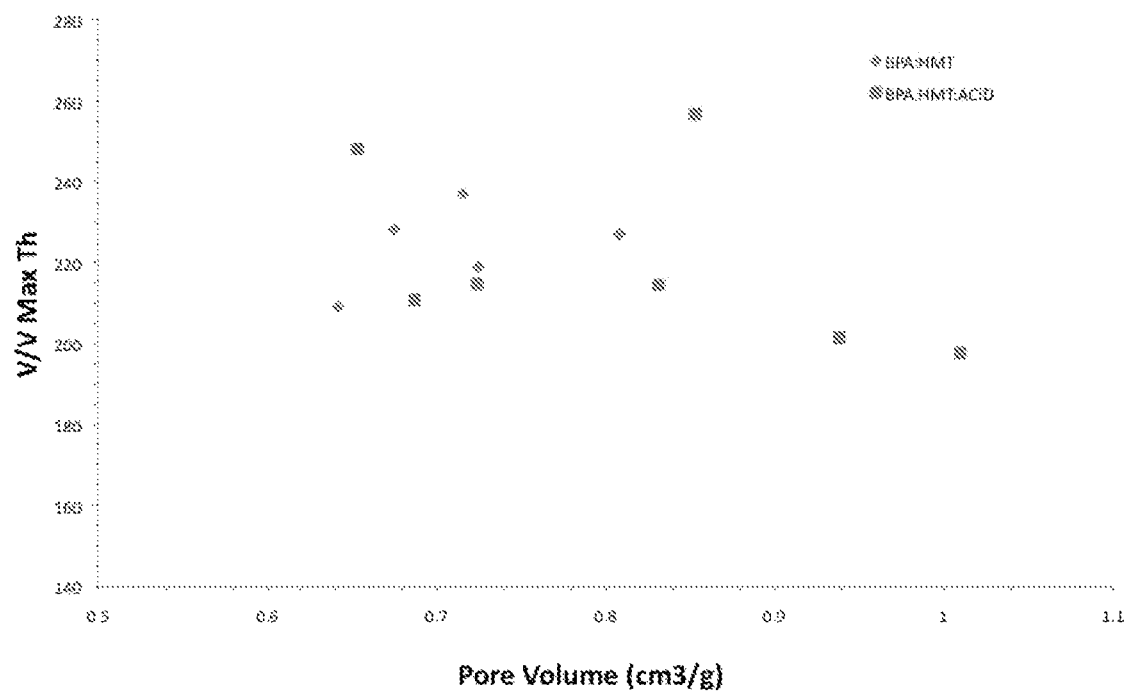

Figure 5. Gravimetric methane adsorption as a function of pore volume for various carbon samples
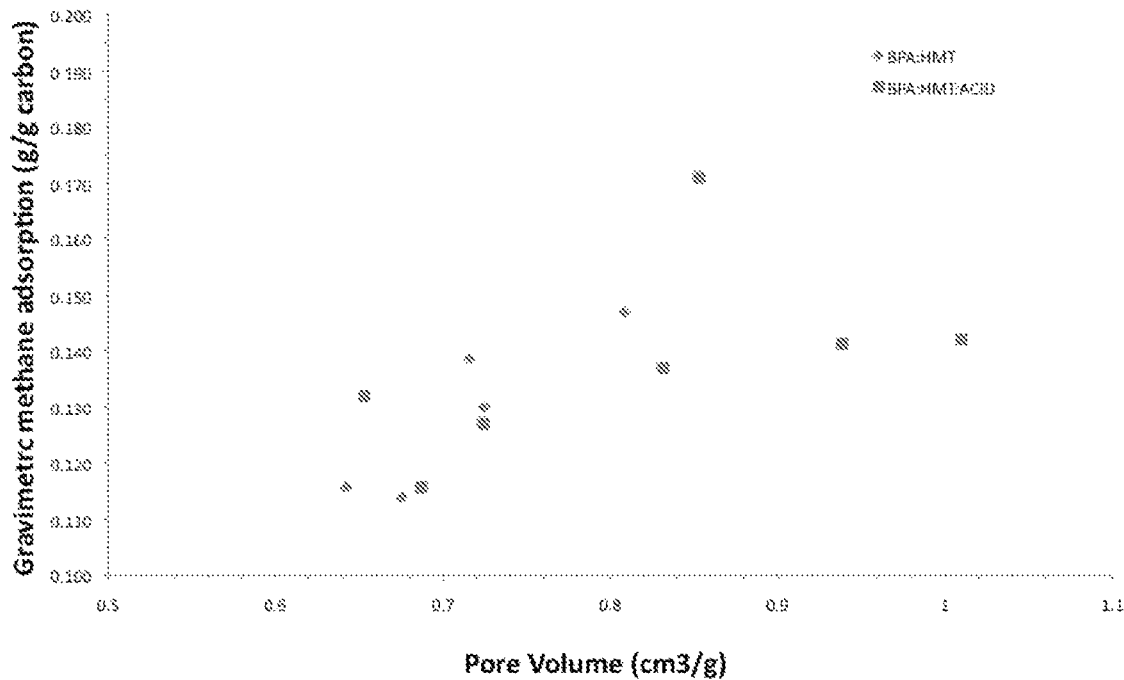

Figure 6. Particle size distribution for jet milled carbon of Example 11.
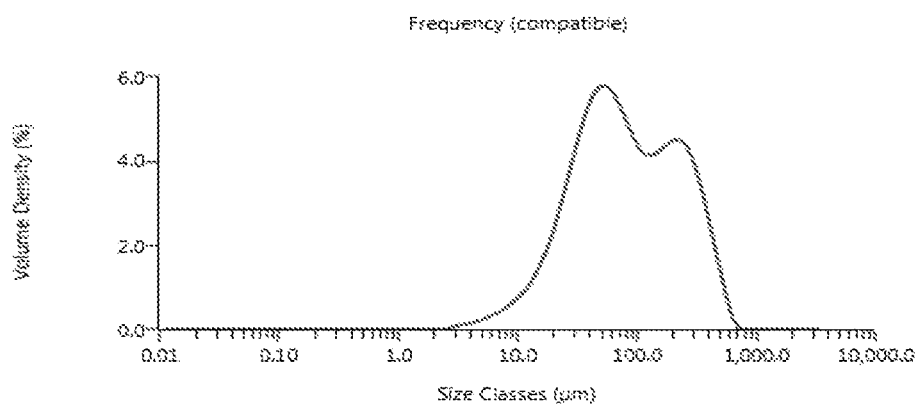

Figure 7. Pore distribution for jet milled carbon of Example 11.
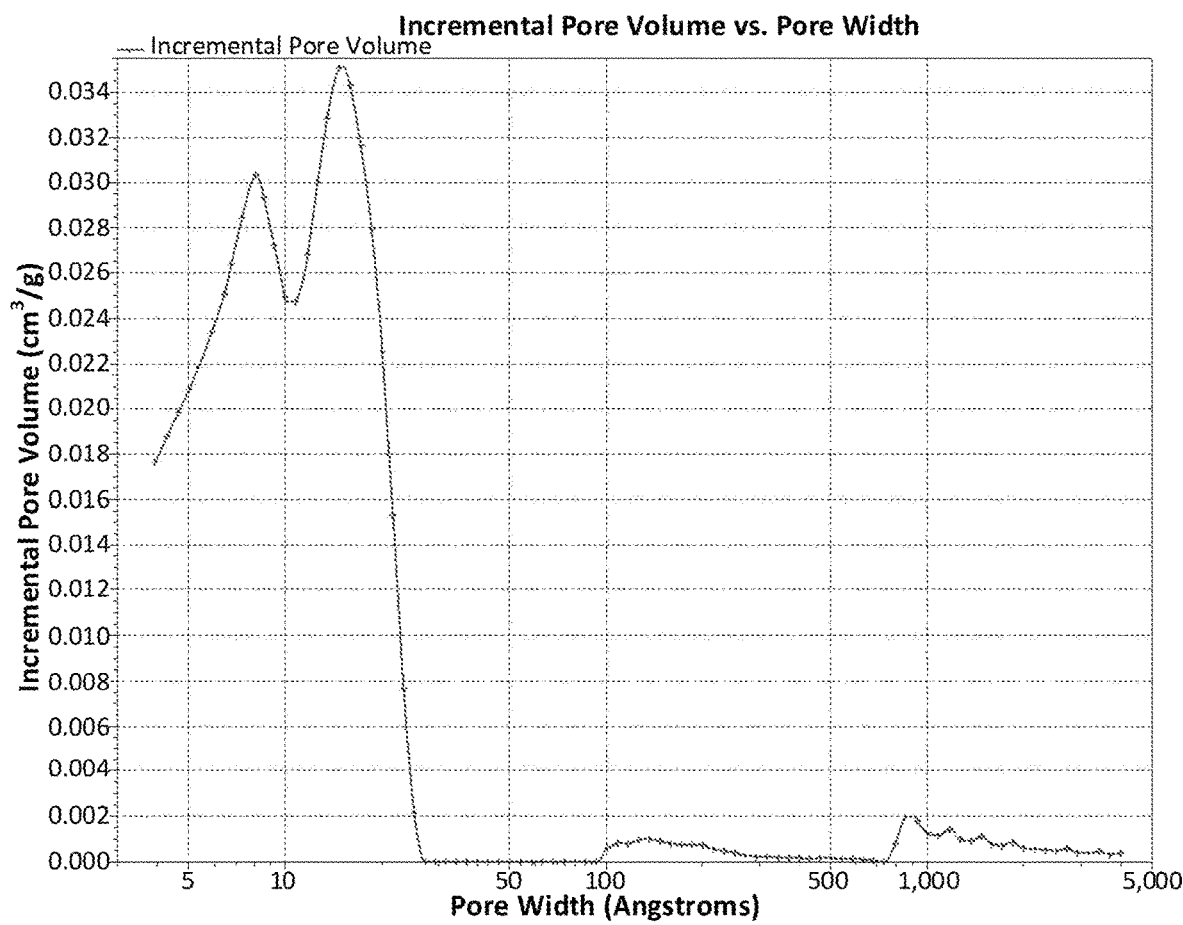

Figure 8.     Compression density and v/v data for representative carbon materials
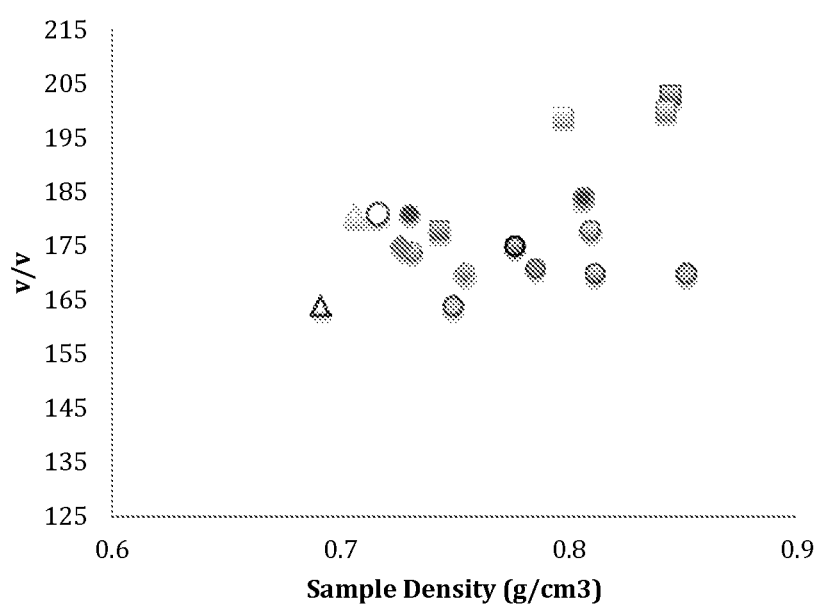

ered as U.S. Pat. No.

CARBON-BASED COMPOSITIONS WITH HIGHLY EFFICIENT VOLUMETRIC GAS SORPTION

CROSS-REFERENCE TO RELATED APPLICATIONS

This application is a Continuation of U.S. patent application Ser. No. 17/023,019, filed Sep. 16, 2020, which is a Continuation of U.S. patent application Ser. No. 16/219,678, filed Dec. 13, 2018 (issued as U.S. Pat. No. 10,814,304), which is a Divisional of U.S. patent application Ser. No. 14/533,956, filed Nov. 5, 2014 (issued as U.S. Pat. No. 10,195,583), which claims the benefit of priority from U.S. Provisional No. 61/900,310, filed Nov. 5, 2013), the entire contents of each of which are incorporated herein by reference.

BACKGROUND

Technical Field

The present invention generally relates to materials with utility for gas storage and delivery applications. The materials can be carbon-based, for example activated carbon monoliths, particles, or mixtures of particles with varying properties. The present invention also relates to compositions and devices containing such materials and methods related to the same.

Description of the Related Art

Recent increases in demand for oil, associated price increases, and environmental issues are continuing to exert pressure on an already stretched world energy infrastructure. Abundant and low cost natural gas resulting from recent advances in extraction technology represents a clean and abundant fossil fuel that could transition from this troubled oil and gasoline dominated market to the expected eventual adoption of renewable energy. However, one of the hurdles to widespread use of natural gas in automobiles and power plants is storage of the gas. An ideal gas storage vessel should contain gas at reasonable temperatures and pressures while maintaining a low weight, a small volume, and minimal cost. There are problems associated with highly compressed natural gas (CNG) and cryogenic liquid natural gas (LNG).

One of the favored alternatives to these two storage methods is natural gas adsorbed on a microporous medium such as activated carbon. Adsorbed natural gas (ANG) has demonstrated storage performance competitive with CNG, but at pressures as low as 30-50 bar (compared to 200-250 bar for CNG). This relatively low pressure allows for easier tank filling, provides room for non-cylinder form factors, allows for optional tank materials and increases the safety of a tank.

Activated carbon is the dominant material in research on storage of adsorbed methane and is typically synthesized by pyrolysis (i.e., carbonization) and activation treatments on existing organic materials such as coconut fibers, carbon fibers, and even tire rubber. However, few of these precursor materials can be easily engineered to any significant degree.

A need exists for a carbon material having a pore structure and density that can be adjusted to produce carbon materials for low-pressure methane or natural gas storage. The present invention fulfills this need and provides further related advantages

BRIEF SUMMARY

In general terms, the present invention is directed to energy storage materials with utility for storage and delivery of gases. In one embodiment, the energy storage material comprises carbon. In one embodiment, the carbon material is monolithic. In other embodiments, the carbon material comprises particles.

In one particular embodiment, the energy storage material is activated carbon and the energy storage particles are activated carbon particles. In certain embodiments, the plurality of carbon particles comprises a blend of particles of varying physicochemical properties, for example pore volume, resulting in increased gas storage properties. In certain other embodiments, the particle size distribution is such that particle packing is optimized relative to other known carbon materials, resulting in increased gas storage properties. Such blending of carbon particles with varying physicochemical properties and/or particle sizes allows for preparation of carbon-based gas storage devices with volumetric performance not previously obtainable. Accordingly, the disclosed carbon materials and devices comprising the same find application in the context of gas storage.

In one aspect, the present invention provides a carbon material having a tap density of from 0.5 to 0.8 g/cm3, over 0.90 packing ratio, a surface area of from about 1000 to about 2000 $m^2/g$, a total pore volume of from about 0.4 to about 1.4 $cm^3/g$, and an excess methane storage capacity from about 0.10-0.15 g/g at room temperature and at 50 bar.

In certain embodiments, the tap density is from 0.6 to 0.7 g/cm3, the packing ratio is greater than 0.95, the surface area is from 1500 to 2000 $m^2/g$, the total pore volume if from 0.5 to 1.0 cm3/g, and an excess methane storage capacity from about 0.10-0.15 g/g at room temperature and at 50 bar.

In other embodiments, the invention provides a composition comprising a plurality of gas storage particles, wherein the packing efficiency of the plurality of gas storage particles is 80% or greater.

In some of the foregoing embodiments, the gas storage particles are carbon particles with a tap density of 0.5 g/cm3 or greater, a surface area of 1000 $m^2/g$ or greater, a total pore volume of 0.5 cm3/g or greater, and a gravimetric methane adsorption of 0.10 g/g or greater. For example, in some embodiments the carbon particles have a tap density of 0.6 g/cm3 or greater, a surface area of 1500 $m^2/g$ or greater, a total pore volume of 0.7 $cm^3/g$ or greater, and a gravimetric methane adsorption of 0.12 g/g or greater.

In still other embodiments, from 1-40% of the total pore volume resides in mesopores and from 1-50% of the total pore volume resides in macropores. In different embodiments, the volume average particle size (Dv,50) of the plurality of gas storage particles is between 0.1 um and 50 mm.

In other of the foregoing embodiments, the packing efficiency is 90% or greater, 95% or greater or even 99% or greater.

In some other different embodiments, the invention is directed to a composition comprising a mixture of two or more populations of gas storage particles, wherein the packing efficiency of the mixture is 80% or greater. In some of these embodiments, the composition comprises carbon particles wherein from 5%-30% of the carbon particles have a surface area below 1500 $m^2/g$, from 10%-80% of the carbon particles have a surface area of from 1500 $m^2/g$ to 1800 $m^2/g$, and from 5-30% of the carbon particles have a surface area greater than 1800 $m^2/g$. In still different embodiments, the composition comprises carbon particles wherein from 20-80% of the carbon particles have a surface area of 1600 m²/g or lower, and from 20-80% of the carbon particles have surface area of 2000 m²/g or higher.

In other embodiments of the foregoing composition, the tap density of the composition is 0.6 g/cm3 or greater, the mass average surface area of the composition is 1500 m²/g or greater, the mass average total pore volume of the composition is 0.7 cm³/g, and the gravimetric methane adsorption of the composition is 0.12 g/g or greater. In other embodiments, the gas storage particles comprise a pore volume and from 1-40% of the pore volume resides in mesopores and from 1-50% of the pore volume resides in macropores.

In yet other embodiments, the volume average particle size Dv,50 of the two or more populations of gas storage particles is between 0.1 um and 50 mm. In more embodiments of the foregoing composition, the packing efficiency of the composition is 90% or greater, 95% or greater or 99% or greater.

In different embodiments, a carbon material having a specific gravimetric methane adsorption of 0.13 g/g or greater at room temperature and 50 bar pressure is provided. In some of these embodiments, the specific gravimetric methane adsorption is 0.15 g/g or greater or 0.17 g/g or greater.

In other embodiments, the tap density of the carbon material is 0.6 g/cm³ or greater, the mass average surface area is 1500 m²/g or greater and the mass average total pore volume is 0.7 cm³/g.

In other embodiments, the carbon material comprises a mixture of two or more populations of particles, wherein from 5%-30% of the particles have a surface area below 1500 m²/g, from 10%-80% of the particles have a surface area of from 1500 m²/g to 1800 m²/g and from 5-30% of the particles have a surface area greater than 1800 m²/g. In other embodiments, the carbon material comprises a mixture of two or more populations of particles, wherein from 20-80% of the particles have a surface area of 1600 m²/g or lower and from 20-80% of particles have a surface area of 2000 m²/g or higher.

In still other embodiments, the carbon material comprises a pore volume and from 1-40% of the pore volume resides in mesopores, and from 1-50% of the pore volume resides in macropores.

In even more embodiments, the volume average particle size Dv,50 of the carbon material is between 0.1 um and 50 mm. In some different embodiments, the packing efficiency of the carbon material is 90% or greater, 95% or greater or 99% or greater.

Other different embodiments are directed to a carbon material comprising a compression density of at least 0.7 g/cm3 and at least 170 v/v. In some embodiments, the carbon material comprises at least 180 v/v. In more embodiments, the carbon material comprises a compression density of at 0.8 g/cm³. In even more different embodiments, the carbon material comprises at least 200 v/v.

In still other embodiments a gas storage device is provided, the gas storage device comprising any of the compositions or carbon materials disclosed herein. In some of these embodiments the gas stored in the gas storage device comprises methane, ethane, hydrogen, natural gas, or any combinations thereof. In some embodiments, the gas storage capacity retention of the gas storage device at 1000 cycles is 80% or greater.

In other embodiments, a method of manufacturing a gas storage monolith is provided, wherein the method comprises compressing any of the compositions or carbon material described herein at a force of 4 Nm or greater.

Other embodiments are directed to a method for preparing a gas storage material, the method comprising polymerizing polymer precursors to obtain a molded polymer monolith and pyrolyzing the molded polymer monolith as an intact monolith to obtain a pyrolyzed monolith. Some embodiments further comprise activating the pyrolyzed monolith.

Monoliths comprising a plurality of any of the carbon particles described herein are provided in various different embodiments. Such monoliths can be prepared in different embodiments, the preparation method comprising preparing a blend of carbon particles and an optional binder and applying a force to the blend to obtain the monolith. In some embodiments, the method comprises heating the blend before or after, or both, applying the force, for example heating to a temperature from about 100 to about 150 C. In other embodiments, the method further comprises pyrolyzing the monolith by heating in an inert atmosphere, while other embodiments further comprise activating the monolith by heating in a $CO_2$ atmosphere.

In some embodiments, the monolith is a pellet. In other embodiments, the blend comprises a binder, for example in some embodiments the binder is novolac, novolac PEG, lico, CMC (carboxymethylcellulose), PVDF (polyvinylidene fluoride) or combinations thereof. In some other embodiments the blend does not comprise a binder.

These and other aspects of the invention will be apparent upon reference to the following detailed description.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

FIG. 1 is a schematic of an apparatus to measure methane adsorption.

FIG. 2 presents pore size distribution of an exemplary carbon sample.

FIG. 3 is a graph showing particle size distribution of an exemplary carbon sample.

FIG. 4 shows theoretical V/V as a function of pore volume for various carbon samples.

FIG. 5 presents gravimetric methane adsorption data for various carbon samples.

FIG. 6 presents particle size distribution data for a representative carbon material.

FIG. 7 is a graph of pore distribution data for a representative carbon material.

FIG. 8 provides compression density and v/v data for representative carbon materials.

DETAILED DESCRIPTION

In the following description, certain specific details are set forth in order to provide a thorough understanding of various embodiments. However, one skilled in the art will understand that the invention may be practiced without these details. In other instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein, and unless the context dictates otherwise, the following terms have the meanings as specified below.

"Gas storage material" refers to a material capable of storing a gas, for example in the form of a physically entrained gas. Gas storage materials are capable of being charged and discharged with a gas. Examples of gas storage materials include, but are not limited to, carbon and other porous materials. Gas storage materials may be used in the form of particles, or combinations of inter- and/or intraparticle blends of particles.

"Carbon material" refers to a material or substance comprised substantially of carbon. Examples of carbon materials include, but are not limited to, activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like.

"Packing Ratio" is defined as the inverse of the carbon material density divided by the sum of the inverse of the skeletal density of the carbon material (typically 2.2 g/cc) and the carbon materials pore volume as measured using nitrogen sorption. The packing ratio is typically determined after applying a compression force to the carbon material. A packing ratio of 1.0 would indicate that optimized packing has been achieved. A packing ratio of less than one indicates that less than optimum packing has been achieved, and a packing ratio of greater than one indicates that packing is optimized beyond that expected based on the mass and volume of the carbon material.

"Impurity" or "impurity element" refers to a foreign substance (e.g., a chemical element) within a material, which differs from the chemical composition of the base material. For example, an impurity in a carbon material refers to any element or combination of elements, other than carbon, which is present in the carbon material. Impurity levels are typically expressed in parts per million (ppm).

"PIXE impurity" is any impurity element having an atomic number ranging from 11 to 92 (i.e., from sodium to uranium). The phrases "total PIXE impurity content" and "total PIXE impurity level" both refer to the sum of all PIXE impurities present in a sample, for example, a polymer gel or a carbon material. PIXE impurity concentrations and identities may be determined by proton induced x-ray emission (PIXE).

"Ash content" refers to the nonvolatile inorganic matter, which remains after subjecting a substance to a high decomposition temperature. Herein, the ash content of a carbon material is calculated from the total PIXE impurity content as measured by proton induced x-ray emission, assuming that nonvolatile elements are completely converted to expected combustion products (i.e., oxides).

"Polymer" refers to a molecule comprised of two or more structural repeating units.

"Synthetic polymer precursor material" or "polymer precursor" refers to the compounds used in the preparation of a synthetic polymer. Examples of polymer precursors that can be used in the preparations disclosed herein include, but are not limited to aldehydes (i.e., HC(=O)R, where R is an organic group), such as for example, methanal (formaldehyde); ethanal (acetaldehyde); propanal (propionaldehyde); butanal (butyraldehyde); glucose; benzaldehyde and cinnamaldehyde. Other exemplary polymer precursors include, but are not limited to, phenolic compounds such as phenol and polyhydroxy benzenes, such as dihydroxy or trihydroxy benzenes, for example, resorcinol (i.e., 1,3-dihydroxy benzene), catechol, hydroquinone, and phloroglucinol. Mixtures of two or more polyhydroxy benzenes are also contemplated within the meaning of polymer precursor.

"Monolithic" refers to a solid, three-dimensional structure that is not particulate in nature.

"Sol" refers to a colloidal suspension of precursor particles (e.g., polymer precursors), and the term "gel" refers to a wet three-dimensional porous network obtained by condensation or reaction of the precursor particles.

"Polymer gel" refers to a gel in which the network component is a polymer; generally a polymer gel is a wet (aqueous or non-aqueous based) three-dimensional structure comprised of a polymer formed from synthetic precursors or polymer precursors.

"Sol gel" refers to a sub-class of polymer gel where the polymer is a colloidal suspension that forms a wet three-dimensional porous network obtained by reaction of the polymer precursors.

"Polymer hydrogel" or "hydrogel" refers to a subclass of polymer gel or gel wherein the solvent for the synthetic precursors or monomers is water or mixtures of water and one or more water-miscible solvent.

"RF polymer hydrogel" refers to a sub-class of polymer gel wherein the polymer was formed from the catalyzed reaction of resorcinol and formaldehyde in water or mixtures of water and one or more water-miscible solvent.

"Acid" refers to any substance that is capable of lowering the pH of a solution. Acids include Arrhenius, Brønsted and Lewis acids. A "solid acid" refers to a dried or granular compound that yields an acidic solution when dissolved in a solvent. The term "acidic" means having the properties of an acid.

"Base" refers to any substance that is capable of raising the pH of a solution. Bases include Arrhenius, Brønsted and Lewis bases. A "solid base" refers to a dried or granular compound that yields basic solution when dissolved in a solvent. The term "basic" means having the properties of a base.

"Mixed solvent system" refers to a solvent system comprised of two or more solvents, for example, two or more miscible solvents. Examples of binary solvent systems (i.e., containing two solvents) include, but are not limited to: water and acetic acid; water and formic acid; water and propionic acid; water and butyric acid and the like. Examples of ternary solvent systems (i.e., containing three solvents) include, but are not limited to: water, acetic acid, and ethanol; water, acetic acid and acetone; water, acetic acid, and formic acid; water, acetic acid, and propionic acid; and the like. The present invention contemplates all mixed solvent systems comprising two or more solvents.

"Miscible" refers to the property of a mixture wherein the mixture forms a single phase over certain ranges of temperature, pressure, and composition.

"Catalyst" is a substance, which alters the rate of a chemical reaction. Catalysts participate in a reaction in a cyclic fashion such that the catalyst is cyclically regenerated. The present disclosure contemplates catalysts, which are sodium free. The catalyst used in the preparation of a polymer gel as described herein can be any compound that facilitates the polymerization of the polymer precursors to form a polymer gel. A "volatile catalyst" is a catalyst, which has a tendency to vaporize at or below atmospheric pressure. Exemplary volatile catalysts include, but are not limited to, ammoniums salts, such as ammonium bicarbonate, ammonium carbonate, ammonium hydroxide, and combinations thereof.

"Solvent" refers to a substance, which dissolves or suspends reactants (e.g., polymer precursors) and provides a medium in which a reaction may occur. Examples of solvents useful in the preparation of the polymer gels and carbon materials disclosed herein include, but are not limited to, water, alcohols and mixtures thereof. Exemplary alcohols include ethanol, t-butanol, methanol and mixtures thereof. Such solvents are useful for dissolution of the synthetic polymer precursor materials, for example dissolution of a phenolic or aldehyde compound. In addition, in some processes such solvents are employed for solvent exchange in a polymer hydrogel (prior to freezing and drying), wherein the solvent from the polymerization of the precursors, for example, resorcinol and formaldehyde, is exchanged for a pure alcohol. In one embodiment of the present application, a cryogel is prepared by a process that does not include solvent exchange.

"Dried gel" or "dried polymer gel" refers to a gel or polymer gel, respectively, from which the solvent, generally water, or mixture of water and one or more water-miscible solvents, has been substantially removed.

"Pyrolyzed dried polymer gel" refers to a dried polymer gel which has been pyrolyzed but not yet activated, while an "activated dried polymer gel" refers to a dried polymer gel which has been activated.

"Cryogel" refers to a dried gel that has been dried by freeze drying. Analogously, a "polymer cryogel" is a dried polymer gel that has been dried by freeze drying.

"RF cryogel" or "RF polymer cryogel" refers to a dried gel or dried polymer gel, respectively, that has been dried by freeze drying wherein the gel or polymer gel was formed from the catalyzed reaction of resorcinol and formaldehyde.

"Pyrolyzed cryogel" or "pyrolyzed polymer cryogel" is a cryogel or polymer cryogel, respectively, that has been pyrolyzed but not yet activated.

"Activated cryogel" or "activated polymer cryogel" is a cryogel or polymer cryogel, respectively, which has been activated to obtain activated carbon material.

"Xerogel" refers to a dried gel that has been dried by air drying, for example, at or below atmospheric pressure. Analogously, a "polymer xerogel" is a dried polymer gel that has been dried by air drying.

"Pyrolyzed xerogel" or "pyrolyzed polymer xerogel" is a xerogel or polymer xerogel, respectively, that has been pyrolyzed but not yet activated.

"Activated xerogel" or "activated polymer xerogel" is a xerogel or polymer xerogel, respectively, which has been activated to obtain activated carbon material.

"Aerogel" refers to a dried gel that has been dried by supercritical drying, for example, using supercritical carbon dioxide. Analogously, a "polymer aerogel" is a dried polymer gel that has been dried by supercritical drying.

"Pyrolyzed aerogel" or "pyrolyzed polymer aerogel" is an aerogel or polymer aerogel, respectively, that has been pyrolyzed but not yet activated.

"Activated aerogel" or "activated polymer aerogel" is an aerogel or polymer aerogel, respectively, which has been activated to obtain activated carbon material.

"Organic extraction solvent" refers to an organic solvent added to a polymer hydrogel after polymerization of the polymer precursors has begun, generally after polymerization of the polymer hydrogel is complete.

"Rapid multi-directional freezing" refers to the process of freezing a polymer gel by creating polymer gel particles from a monolithic polymer gel, and subjecting said polymer gel particles to a suitably cold medium. The cold medium can be, for example, liquid nitrogen, nitrogen gas, or solid carbon dioxide. During rapid multi-directional freezing nucleation of ice dominates over ice crystal growth. The suitably cold medium can be, for example, a gas, liquid, or solid with a temperature below about −10° C. Alternatively, the suitably cold medium can be a gas, liquid, or solid with a temperature below about −20° C. Alternatively, the suitably cold medium can be a gas, liquid, or solid with a temperature below about −30° C.

"Activate" and "activation" each refer to the process of heating a raw material or carbonized/pyrolyzed substance at an activation dwell temperature during exposure to oxidizing atmospheres (e.g. carbon dioxide, oxygen, or steam) to produce an "activated" substance (e.g. activated cryogel or activated carbon material). The activation process generally results in a stripping away of the surface of the particles, resulting in an increased surface area. Alternatively, activation can be accomplished by chemical means, for example, by impregnation of carbon-containing precursor materials with chemicals such as acids like phosphoric acid or bases like potassium hydroxide, sodium hydroxide or salts like zinc chloride, followed by carbonization. "Activated" refers to a material or substance, for example a carbon material, which has undergone the process of activation.

"Carbonizing", "pyrolyzing", "carbonization" and "pyrolysis" each refer to the process of heating a carbon-containing substance at a pyrolysis dwell temperature in an inert atmosphere (e.g., argon or nitrogen) or in a vacuum such that the targeted material collected at the end of the process is primarily carbon. "Pyrolyzed" refers to a material or substance, for example a carbon material, which has undergone the process of pyrolysis.

"Dwell temperature" refers to the temperature of the furnace during the portion of a process, which is reserved for maintaining a relatively constant temperature (i.e., neither increasing nor decreasing the temperature). For example, the pyrolysis dwell temperature refers to the relatively constant temperature of the furnace during pyrolysis, and the activation dwell temperature refers to the relatively constant temperature of the furnace during activation.

"Pore" refers to an opening or depression in the surface, or a tunnel in a carbon material, such as for example activated carbon, pyrolyzed dried polymer gels, pyrolyzed polymer cryogels, pyrolyzed polymer xerogels, pyrolyzed polymer aerogels, activated dried polymer gels, activated polymer cryogels, activated polymer xerogels, activated polymer aerogels and the like. A pore can be a single tunnel or connected to other tunnels in a continuous network throughout the structure.

"Pore structure" refers to the layout of the surface of the internal pores within a carbon material, such as an activated carbon material. Components of the pore structure include pore size, pore volume, surface area, density, pore size distribution, and pore length. Generally the pore structure of activated carbon material comprises micropores and mesopores.

"Mesopore" generally refers to pores having a diameter between about 2 nanometers and about 50 nanometers while the term "micropore" refers to pores having a diameter less than about 2 nanometers. Mesoporous carbon materials comprise greater than 50% of their total pore volume in mesopores while microporous carbon materials comprise greater than 50% of their total pore volume in micropores. "Surface area" refers to the total specific surface area of a substance measurable by the BET technique. Surface area is typically expressed in units of $m^2/g$. The BET (Brunauer/Emmett/Teller) technique employs an inert gas, for example nitrogen, to measure the amount of gas adsorbed on a material and is commonly used in the art to determine the accessible surface area of materials.

"Connected" when used in reference to mesopores and micropores refers to the spatial orientation of such pores.

"Binder" refers to a material capable of holding individual particles of carbon together such that after mixing a binder and carbon together the resulting mixture can be formed into sheets, pellets, disks or other shapes. Non-exclusive examples of binders include fluoro polymers, such as, for example, PTFE (polytetrafluoroethylene, Teflon), PFA (perfluoroalkoxy polymer resin, also known as Teflon), FEP (fluorinated ethylene propylene, also known as Teflon), ETFE (polyethylenetetrafluoroethylene, sold as Tefzel and Fluon), PVF (polyvinyl fluoride, sold as Tedlar), ECTFE (polyethylenechlorotrifluoroethylene, sold as Halar), PVDF (polyvinylidene fluoride, sold as Kynar), PCTFE (polychlorotrifluoroethylene, sold as Kel-F and CTFE), trifluoroethanol and combinations thereof.

"Inert" refers to a material that is not active in the electrolyte that is it does not absorb a significant amount of ions or change chemically, e.g., degrade.

"Excess methane storage capacity" or "gravimetric methane adsorption" is the ratio of the mass of methane adsorbed per mass of carbon. Typically, the excess methane storage capacity if reported as measured at the conditions of 50 bar and room temperature.

"v/v" is a property of a gas storage medium (e.g., gas storage particles) and refers to the unit volume of gas which can be stored (e.g., the maximum storable gas) per unit volume of gas storage particles. In some embodiments the gas storage particles are carbon particles. In some embodiments the stored gas is methane, ethane, hydrogen or natural gas or any combination thereof.

As noted above, the present disclosure provides in some embodiments, a gas storage material comprising a plurality of gas storage particles, wherein the plurality of gas storage particles comprise a distribution of physicochemical properties and/or particle size distribution such that the packing ratio is greater than 0.8, for example greater than 0.9, for example greater than 0.95, for example greater than 0.97, for example greater than 1.0, for example about 1.0. For example in some embodiments, the gas storage material is a carbon material.

In another embodiment, a gas storage device comprising a carbon material is provided. The carbon material comprises a plurality of carbon particles, the plurality of carbon particles comprise a distribution of physicochemical properties and/or particle size distribution such that the packing ratio is greater than 0.8, for example greater than 0.9, for example greater than 0.95, for example greater than 0.97, for example greater than 1.0, for example about 1.0.

In other embodiments, the present disclosure is directed to a gas storage vessel comprising a carbon material, wherein the carbon material comprises a plurality of carbon particles, the plurality of carbon particles comprise a distribution of physicochemical properties and/or particle size distribution such that the packing ratio is greater than 0.8, for example greater than 0.9, for example greater than 0.95, for example greater than 0.97, for example greater than 1.0, for example about 1.0.

In still other embodiments, the disclosure is directed to a plurality of carbon particles, wherein the carbon particles have a packing ratio of at least 0.8, for example greater than 0.9, for example greater than 0.95, for example greater than 0.97, for example greater than 1.0, for example about 1.0, when combined with a binder and formed into monolithic structure under compression, for example a compression ranging from about 0.1 to about 10 Newtons or about 1 to about 2 standard tons.

In certain other embodiments, the carbon particles have a packing ratio of at least 0.8, for example greater than 0.9, for example greater than 0.95, for example greater than 0.97, for example greater than 1.0, for example about 1.0, when formed into monolithic structure under compression in the absence of a binder In certain embodiments, the carbon particles comprise a blend of two, three, four, or more than four different carbon materials, each carbon material having different physicochemical properties and/or different particle size distributions. In one embodiment the carbon particles comprise a blend of three different carbon materials, each carbon material having different physicochemical properties and/or different particle size distributions. In another embodiment the carbon particles comprise a blend of three different carbon materials, each carbon material having different physicochemical properties and/or different particle size distributions.

In certain embodiments, the carbon materials comprise a mixture of carbon materials of different specific surface areas, wherein 0 to 99% of the mass comprises carbon materials having a specific surface area from 1200 to 1500 m2/g, 0-99% of the mass comprises carbon materials having a specific surface area from 1500 to 1800 m2/g, 0-99% of the mass comprises carbon materials having a specific surface area from 1800 to 2100 m2/g, 0-99% of the mass comprises carbon materials having a specific surface area from 2100 to 2400 m2/g, and 0-99% of the mass comprises carbon materials having a specific surface area from 2400 to 2700 m2/g.

In certain embodiments, the carbon materials comprise a mixture of carbon materials wherein 90-99% of the mass comprises carbon materials having a specific surface area from 1200 to 1500 m2/g, and 1-10% of the mass comprises carbon materials having a specific surface area from 1500 to 1800 m2/g. In another embodiment, the carbon materials comprise a mixture of carbon materials wherein 90-99% of the mass comprises carbon materials having a specific surface area from 1200 to 1500 m2/g, and 1-10% of the mass comprises carbon materials having a specific surface area from 1800 to 2100 m2/g. In another embodiment, the carbon materials comprise a mixture of carbon materials wherein 90-99% of the mass comprises carbon materials having a specific surface area from 1200 to 1500 m2/g, and 1-10% of the mass comprises carbon materials having a specific surface area from 2100 to 2400 m2/g. In another embodiment, the carbon materials comprise a mixture of carbon materials wherein 90-99% of the mass comprises carbon materials having a specific surface area from 1200 to 1500 m2/g, and 1-10% of the mass comprises carbon materials having a specific surface area from 2400 to 2700 m2/g.

In certain embodiments, the carbon materials comprise a mixture of carbon materials wherein 80-99% of the mass comprises carbon materials having a specific surface area from 1200 to 1500 m2/g, and 11-20% of the mass comprises carbon materials having a specific surface area from 1500 to 1800 m2/g. In another embodiment, the carbon materials comprise a mixture of carbon materials wherein 80-89% of the mass comprises carbon materials having a specific surface area from 1200 to 1500 m2/g, and 11-20% of the mass comprises carbon materials having a specific surface area from 1800 to 2100 m2/g. In another embodiment, the carbon materials having a specific surface area from a mixture of carbon materials wherein 80-89% of the mass comprises carbon materials having a specific surface area from 1200 to 1500 m2/g, and 11-20% of the mass comprises carbon materials having a specific surface area from 2100 to 2400 m2/g. In another embodiment, the carbon materials comprise a mixture of carbon materials wherein 80-89% of the mass comprises carbon materials having a specific surface area from 1200 to 1500 m2/g, and 11-20% of the mass comprises carbon materials having a specific surface area from 2400 to 2700 m2/g.

In certain embodiments, the carbon materials comprise a mixture of carbon materials wherein 70-79% of the mass comprises carbon materials having a specific surface area from 1200 to 1500 m2/g, and 21-30% of the mass comprises carbon materials having a specific surface area from 1500 to 1800 m2/g. In another embodiment, the carbon materials comprise a mixture of carbon materials wherein 70-79% of the mass comprises carbon materials having a specific surface area from 1200 to 1500 m2/g, and 21-30% of the mass comprises carbon materials having a specific surface area from 1800 to 2100 m2/g. In another embodiment, the carbon materials comprise a mixture of carbon materials wherein 70-79% of the mass comprises carbon materials having a specific surface area from 1200 to 1500 m2/g, and 21-30% of the mass comprises carbon materials having a specific surface area from 2100 to 2400 m2/g. In another embodiment, the carbon materials comprise a mixture of carbon materials wherein 70-79% of the mass comprises carbon materials having a specific surface area from 1200 to 1500 m2/g, and 21-30% of the mass comprises carbon materials having a specific surface area from 2400 to 2700 m2/g.

In certain embodiments, the carbon materials comprise a mixture of carbon materials wherein 60-69% of the mass comprises carbon materials having a specific surface area from 1200 to 1500 m2/g, and 31-40% of the mass comprises carbon materials having a specific surface area from 1500 to 1800 m2/g. In another embodiment, the carbon materials comprise a mixture of carbon materials wherein 60-69% of the mass comprises carbon materials having a specific surface area from 1200 to 1500 m2/g, and 31-40% of the mass comprises carbon materials having a specific surface area from 1800 to 2100 m2/g. In another embodiment, the carbon materials comprise a mixture of carbon materials wherein 60-69% of the mass comprises carbon materials having a specific surface area from 1200 to 1500 m2/g, and 31-40% of the mass comprises carbon materials having a specific surface area from 2100 to 2400 m2/g. In another embodiment, the carbon materials comprise a mixture of carbon materials wherein 60-69% of the mass comprises carbon materials having a specific surface area from 1200 to 1500 m2/g, and 31-40% of the mass comprises carbon materials having a specific surface area from 2400 to 2700 m2/g.

In certain embodiments, the carbon materials comprise a mixture of carbon materials wherein 50-59% of the mass comprises carbon materials having a specific surface area from 1200 to 1500 m2/g, and 41-50% of the mass comprises carbon materials having a specific surface area from 1500 to 1800 m2/g. In another embodiment, the carbon materials comprise a mixture of carbon materials wherein 50-59% of the mass comprises carbon materials having a specific surface area from 1200 to 1500 m2/g, and 41-50% of the mass comprises carbon materials having a specific surface area from 1800 to 2100 m2/g. In another embodiment, the carbon materials comprise a mixture of carbon materials wherein 50-59% of the mass comprises carbon materials having a specific surface area from 1200 to 1500 m2/g, and 41-50% of the mass comprises carbon materials having a specific surface area from 2100 to 2400 m2/g. In another embodiment, the carbon materials comprise a mixture of carbon materials wherein 50-59% of the mass comprises carbon materials having a specific surface area from 1200 to 1500 m2/g, and 41-50% of the mass comprises carbon materials having a specific surface area from 2400 to 2700 m2/g.

In certain embodiments, the carbon materials comprise a mixture of carbon materials wherein 90-99% of the mass comprises carbon materials having a specific surface area from 1500 to 1800 m2/g, and 1-10% of the mass comprises carbon materials having a specific surface area from 1800 to 2100 m2/g. In another embodiment, the carbon materials comprise a mixture of carbon materials wherein 90-99% of the mass comprises carbon materials having a specific surface area from 1500 to 1800 m2/g, and 1-10% of the mass comprises carbon materials having a specific surface area from 2100 to 2400 m2/g. In another embodiment, the carbon materials comprise a mixture of carbon materials wherein 90-99% of the mass comprises carbon materials having a specific surface area from 1500 to 1800 m2/g, and 1-10% of the mass comprises carbon materials having a specific surface area from 2400 to 2700 m2/g.

In certain embodiments, the carbon materials comprise a mixture of carbon materials wherein 80-89% of the mass comprises carbon materials having a specific surface area from 1500 to 1800 m2/g, and 11-20% of the mass comprises carbon materials having a specific surface area from 1800 to 2100 m2/g. In another embodiment, the carbon materials comprise a mixture of carbon materials wherein 80-89% of the mass comprises carbon materials having a specific surface area from 1500 to 1800 m2/g, and 11-20% of the mass comprises carbon materials having a specific surface area from 2100 to 2400 m2/g. In another embodiment, the carbon materials comprise a mixture of carbon materials wherein 80-89% of the mass comprises carbon materials having a specific surface area from 1500 to 1800 m2/g, and 11-20% of the mass comprises carbon materials having a specific surface area from 2400 to 2700 m2/g.

In certain embodiments, the carbon materials comprise a mixture of carbon materials wherein 70-79% of the mass comprises carbon materials having a specific surface area from 1500 to 1800 m2/g, and 21-30% of the mass comprises carbon materials having a specific surface area from 1800 to 2100 m2/g. In another embodiment, the carbon materials comprise a mixture of carbon materials wherein 70-79% of the mass comprises carbon materials having a specific surface area from 1500 to 1800 m2/g, and 21-30% of the mass comprises carbon materials having a specific surface area from 2100 to 2400 m2/g. In another embodiment, the carbon materials comprise a mixture of carbon materials wherein 70-79% of the mass comprises carbon materials having a specific surface area from 1500 to 1800 m2/g, and 21-30% of the mass comprises carbon materials having a specific surface area from 2400 to 2700 m2/g.

In certain embodiments, the carbon materials comprise a mixture of carbon materials wherein 60-69% of the mass comprises carbon materials having a specific surface area from 1500 to 1800 m2/g, and 31-40% of the mass comprises carbon materials having a specific surface area from 1800 to 2100 m2/g. In another embodiment, the carbon materials comprise a mixture of carbon materials wherein 60-69% of the mass comprises carbon materials having a specific surface area from 1500 to 1800 m2/g, and 31-40% of the mass comprises carbon materials having a specific surface area from 2100 to 2400 m2/g. In another embodiment, the carbon materials comprise a mixture of carbon materials wherein 60-69% of the mass comprises carbon materials having a specific surface area from 1500 to 1800 m2/g, and 31-40% of the mass comprises carbon materials having a specific surface area from 2400 to 2700 m2/g.

In certain embodiments, the carbon materials comprise a mixture of carbon materials wherein 50-59% of the mass comprises carbon materials having a specific surface area from 1500 to 1800 m2/g, and 41-50% of the mass comprises carbon materials having a specific surface area from 1800 to 2100 m2/g. In another embodiment, the carbon materials comprise a mixture of carbon materials wherein 60-69% of the mass comprises carbon materials having a specific surface area from 1500 to 1800 m2/g, and 41-50% of the mass comprises carbon materials having a specific surface area from 2100 to 2400 m2/g. In another embodiment, the carbon materials comprise a mixture of carbon materials wherein 60-69% of the mass comprises carbon materials having a specific surface area from 1500 to 1800 m2/g, and 41-50% of the mass comprises carbon materials having a specific surface area from 2400 to 2700 m2/g.

In certain embodiments, the carbon materials comprise a mixture of two to six carbon materials of different total pore volumes, wherein 0-to 99% of the mass comprises carbon materials having a total pore volume from 0.4 to 0.64 cm3/g, 0-99% of the mass comprises carbon materials having a total pore volume from 0.65 to 0.79 cm3/g, 0-99% of the mass comprises carbon materials having a total pore volume from 0.8 to 0.94 cm3/g, 0-99% of the mass comprises carbon materials having a total pore volume from 0.95 to 1.09 cm3/g, 0-99% of the mass comprises carbon materials having a total pore volume from 1.1 to 1.24 cm3/g, and 0-99% of the mass comprises carbon materials having a total pore volume from 1.24 to 1.4 cm3/g.

In certain embodiments, the carbon materials comprise a mixture of carbon materials wherein 90-99% of the mass comprises carbon materials having a total pore volume from 0.4 to 0.64 cm3/g, and 1-10% of the mass comprises carbon materials having a total pore volume from 0.65 to 0.79 cm3/g. In another embodiment, the carbon materials comprise a mixture of carbon materials wherein 90-99% of the mass comprises carbon materials having a total pore volume from 0.4 to 0.64 cm3/g, and 1-10% of the mass comprises carbon materials having a total pore volume from 0.8 to 0.94 cm3/g. In another embodiment, the carbon materials comprise a mixture of carbon materials wherein 90-99% of the mass comprises carbon materials having a total pore volume from 0.4 to 0.64 cm3/g, and 1-10% of the mass comprises carbon materials having a total pore volume from 0.95 to 1.09 cm3/g. In another embodiment, the carbon materials comprise a mixture of carbon materials wherein 90-99% of the mass comprises carbon materials having a total pore volume from 0.4 to 0.64 cm3/g, and 1-10% of the mass comprises carbon materials having a total pore volume from 1.1 to 1.24 cm3/g.

In certain embodiments, the carbon materials comprise a mixture of carbon materials wherein 80-89% of the mass comprises carbon materials having a total pore volume from 0.4 to 0.64 cm3/g, and 11-20% of the mass comprises carbon materials having a total pore volume from 0.65 to 0.79 cm3/g. In another embodiment, the carbon materials comprise a mixture of carbon materials wherein 80-89% of the mass comprises carbon materials having a total pore volume from 0.4 to 0.64 cm3/g, and 11-20% of the mass comprises carbon materials having a total pore volume from 0.8 to 0.94 cm3/g. In another embodiment, the carbon materials comprise a mixture of carbon materials wherein 80-89% of the mass comprises carbon materials having a total pore volume from 0.4 to 0.64 cm3/g, and 11-20% of the mass comprises carbon materials having a total pore volume from 0.95 to 1.09 cm3/g. In another embodiment, the carbon materials comprise a mixture of carbon materials wherein 80-89% of the mass comprises carbon materials having a total pore volume from 0.4 to 0.64 cm3/g, and 11-20% of the mass comprises carbon materials having a total pore volume from 1.1 to 1.24 cm3/g.

In certain embodiments, the carbon materials comprise a mixture of carbon materials wherein 70-79% of the mass comprises carbon materials having a total pore volume from 0.4 to 0.64 cm3/g, and 21-30% of the mass comprises carbon materials having a total pore volume from 0.65 to 0.79 cm3/g. In another embodiment, the carbon materials comprise a mixture of carbon materials wherein 70-79% of the mass comprises carbon materials having a total pore volume from 0.4 to 0.64 cm3/g, and 21-30% of the mass comprises carbon materials having a total pore volume from 0.8 to 0.94 cm3/g. In another embodiment, the carbon materials comprise a mixture of carbon materials wherein 70-79% of the mass comprises carbon materials having a total pore volume from 0.4 to 0.64 cm3/g, and 21-30% of the mass comprises carbon materials having a total pore volume from 0.95 to 1.09 cm3/g. In another embodiment, the carbon materials comprise a mixture of carbon materials wherein 70-79% of the mass comprises carbon materials having a total pore volume from 0.4 to 0.64 cm3/g, and 21-30% of the mass comprises carbon materials having a total pore volume from 1.1 to 1.24 cm3/g.

In certain embodiments, the carbon materials comprise a mixture of carbon materials wherein 60-69% of the mass comprises carbon materials having a total pore volume from 0.4 to 0.64 cm3/g, and 31-40% of the mass comprises carbon materials having a total pore volume from 0.65 to 0.79 cm3/g. In another embodiment, the carbon materials comprise a mixture of carbon materials wherein 60-69% of the mass comprises carbon materials having a total pore volume from 0.4 to 0.64 cm3/g, and 31-40% of the mass comprises carbon materials having a total pore volume from 0.8 to 0.94 cm3/g. In another embodiment, the carbon materials comprise a mixture of carbon materials wherein 60-69% of the mass comprises carbon materials having a total pore volume from 0.4 to 0.64 cm3/g, and 31-40% of the mass comprises carbon materials having a total pore volume from 0.95 to 1.09 cm3/g. In another embodiment, the carbon materials comprise a mixture of carbon materials wherein 60-69% of the mass comprises carbon materials having a total pore volume from 0.4 to 0.64 cm3/g, and 31-40% of the mass comprises carbon materials having a total pore volume from 1.1 to 1.24 cm3/g.

In certain embodiments, the carbon materials comprise a mixture of carbon materials wherein 50-59% of the mass comprises carbon materials having a total pore volume from 0.4 to 0.64 cm3/g, and 4-50% of the mass comprises carbon materials having a total pore volume from 0.65 to 0.79 cm3/g. In another embodiment, the carbon materials comprise a mixture of carbon materials wherein 50-59% of the mass comprises carbon materials having a total pore volume from 0.4 to 0.64 cm3/g, and 41-50% of the mass comprises carbon materials having a total pore volume from 0.8 to 0.94 cm3/g. In another embodiment, the carbon materials comprise a mixture of carbon materials wherein 50-59% of the mass comprises carbon materials having a total pore volume from 0.4 to 0.64 cm3/g, and 41-50% of the mass comprises carbon materials having a total pore volume from 0.95 to 1.09 cm3/g. In another embodiment, the carbon materials comprise a mixture of carbon materials wherein 50-59% of the mass comprises carbon materials having a total pore volume from 0.4 to 0.64 cm3/g, and 41-50% of the mass comprises carbon materials having a total pore volume from 1.1 to 1.24 cm3/g.

The carbon materials described herein have utility for adsorbing gases, for example methane, in the context of its storage and distribution as an energy source. Other gases in this regard that the carbon materials may adsorb include, but are limited to, ethane, propane, butane, hydrogen, oxygen, ethylene, diethyl ether, and mixtures thereof.

The ability of the carbon materials to adsorb gases can be measured according to principles described in the art. For example, methane adsorption can be measured by instruments and methodologies described in the examples herein. The excess adsorption amount (nex) is the only quantity associated to the adsorbed phase readily accessible to measurements. It is defined by the difference, under given temperature and pressure (P,T), between the amount of adsorbate stored in the porous volume of the adsorbent and the amount that would be present in an identical volume in absence of solid-gas interactions. The total methane storage ($n_{tot}$) differs from $n_{ex}$ as it accounts for the total amount of adsorbate molecules present in the bulk volume of the material. $n_{tot}$ is virtually the convolution of all the methane stored in the adsorbing space (i.e. absolute adsorption) and in the non adsorbing space not subject to gas-solid attraction (i.e., gas compressed in interparticle voids and macropores). $n_{tot}$ can be calculated from $n_{ex}$ according to the following equation: $n_{tot}=n_{ex}+\rho_g \times \rho_g$. Where $\rho_g$ is the density of the bulk gas and $V_v$ is the total void volume of the adsorbent. The void volume $V_v$ is obtained from the bulk density ($\rho_g$) and the skeletal density ($\rho_{ske}$) of the adsorbent using: $Vv=(1/\rho_g)-(1/\rho_{ske})$.

In some embodiments, the excess methane storage capacity of the carbon materials can range from 0.090-0.180 g/g, for example from 0.09-0.099 g/g, for example from 0.100 to 0.109 g/g, for example from 0.110 to 0.119 g/g, for example from 0.120 to 0.129 g/g, for example from 0.13 to 0.139 g/g, for example from 0.140 to 0.149 g/g, for example from 0.150 to 0.159 g/g, for example from 0.160 to 0.169 g/g, for example from 0.170 to 0.180 g/g.

In some other embodiments, the carbon materials comprise a skeletal density ranging from 1.9 to 2.4 g/cm3, for example from 1.9 to 1.99 g/cm3, for example from 2 to 2.09 g/cm3, for example from 2.1 to 2.19 g/cm3, for example, from 2.2 to 2.29 g/cm3, for example from 2.3 to 2.4 g/cm3.

In another embodiment, the carbon materials comprise a methane storage capacity of 0.10 to 0.15 g/g and a skeletal density of 1.9 to 2.4 g/cm3. In a different embodiment, the carbon material comprises a methane storage capacity of 0.12 to 0.13 g/g and a skeletal density of 2.1 to 2.3 g/cm3.

In certain embodiments, the carbon materials comprise a tap (or bulk) density of 0.4 to 0.8 g/cm3, for example between 0.4 to 0.44 g/cm3, for example from 0.45 to 0.49 g/cm3, for example from 0.50 to 0.54 g/cm3, for example from 0.55 to 0.59 g/cm3, for example from 0.60 to 0.64 g/cm3, for example from 0.65 to 0.69 g/cm3, for example from 0.70 to 0.74 g/cm3, for example from 0.75 to 0.8 g/cm3. In another embodiment, the carbon material comprises a tap density of 0.6 to 0.8 g/cm3.

In yet other embodiments, the carbon material comprises a methane storage capacity of 0.10 to 0.15 g/g, a skeletal density of 1.9 to 2.4 g/cm3, a tap density of 0.6 to 0.8 g/cm3, and a packing ratio greater than 0.9. In another preferred embodiment, the carbon material comprises a methane storage capacity of 0.12 to 0.13 g/g, a skeletal density of 2.1 to 2.3 g/cm3, a tap density of 0.6 to 0.8 g/cm3, and a packing ratio of greater than 0.95.

In different embodiments, the carbon material in its compressed form comprises a total methane uptake of 150 to 240 V/V, for example 150-159 V/V, for example 160-169 V/V, for example 170-179 V/V, for example 180-189 V/V, for example 190-199 V/V, for example 200-209 V/V, for example 210-219 V/V, for example 220-229 V/V, for example 230-240 V/V.

In some embodiments, the carbon material comprises 0.1 to 20% nitrogen, for example from 0.1 to 1%, for example from 1% to 5%, for example from 5% to 10%, for example from 10% to 15%, for example from 15% to 20% on a mass basis.

In some embodiments, the carbon materials comprise a pore volume distribution that includes micropores, mesopores, and macropores, although certain embodiments include carbon materials having a pore size distribution that includes only micropores, only mesopores or only macropores. Other embodiments include carbon materials having pore size distributions which comprise two types of pores selected from micropores, mesopores and macropores.

In some embodiments, the carbon material comprises 90%-100% micropores and 0-10% mesopores. In other embodiments, carbon material comprises 80%-90% micropores and 10-20% mesopores. In other embodiments, carbon material comprises 70%-80% micropores and 20-30% mesopores. In other embodiments, carbon material comprises 60%-70% micropores and 30-40% mesopores. The above embodiments are suitable for adsorption and storage of various gases, for example methane. A further embodiment for natural gas storage includes embodiments where at least 10% of mesopores comprise mesopores between 3 to 50 nm, for example between 5 and 50 nm, for example between 10-50 nm. In other embodiments for natural gas storage, at least 20% of mesopores comprise mesopores between 3 to 50 nm, for example between 5 and 50 nm, for example between 10-50 nm. In other embodiments for natural gas storage, at least 30% of mesopores comprise mesopores between 3 to 50 nm, for example between 5 and 50 nm, for example between 10-50 nm. In other embodiments for natural gas storage, at least 40% of mesopores comprise mesopores between 3 to 50 nm, for example between 5 and 50 nm, for example between 10-50 nm. In other embodiments for natural gas storage, at least 50% of the mesopores comprise mesopores between 3 to 50 nm, for example between 5 and 50 nm, for example between 10-50 nm.

Smaller mesopores are also effective for gas storage (e.g., natural gas) in other various embodiments, Accordingly, in some examples the carbon materials comprise mesopores, wherein at least 90% of the mesopores have a diameter ranging from 2-5 nm, 2-4 nm or 2-3 nm. In other embodiments, the carbon materials comprise mesopores, wherein at least 95% of the mesopores have a diameter ranging from 2-5 nm, 2-4 nm or 2-3 nm. In more embodiments, the carbon materials comprise mesopores, wherein at least 99% of the mesopores have a diameter ranging from 2-5 nm, 2-4 nm or 2-3 nm. In other embodiments, the carbon materials comprise mesopores, wherein at least 99.9% of the mesopores have a diameter ranging from 2-5 nm, 2-4 nm or 2-3 nm.

In still other embodiments, the carbon materials comprise 1-50% macropores, for example, 1-10% macropores, for example 10-20% macropores, for example 20-30% macropores, for example 30-40% macropores, for example 40-50% macropores. The presence of macropores may be particularly beneficial in some embodiments where it is desired to store gas at relatively high pressures.

In some embodiments, the carbon materials are charged with the intended storage gas and discharged over multiple cycles without significant loss in performance (in terms of gas storage capability). For example, the number of charging and discharging cycles can be greater than 100, for example greater than 1,000, for example greater than 2,000, for example greater than 3,000, for example greater than 4,000, for example greater than 5,000, for example greater than 6,000, for example greater than 7,000, for example greater than 10,000. As noted above, the gas storage capacity of the carbon materials not significantly change over multiple charge/discharge cycles. For example, the gas storage materials typically retain at least 80%, 85%, 90%, 95% or even at least 99% of their original gas storage capacity, even after repeated charge/discharge cycles.

In certain other embodiments, greater cycling is achieved where the percentage of micropores less than 1 nm is less than 90%, for example less than 80%, for example less than 70%, for example less than 60%, for example less than 50%, for example less than 40%, for example less than 30%, for example less than 20%, for example less than 10%. In other embodiments, the percentage of micropores less than 1.5 nm is less than 90%, for example less than 80%, for example less than 70%, for example less than 60%, for example less than 50%, for example less than 40%, for example less than 30%, for example less than 20%, for example less than 10%.

In some embodiments, the carbon material comprises an ultrapure synthetic carbon. Details of the preparation of composition of matter for ultrapure synthetic carbon are described below and in co-owned U.S. Pat. No. 8,404,384, which is incorporated by reference in its entirety.

In some embodiments, the synthetic ultrapure carbon material is amorphous. While not wishing to be bound by theory, it is believed that the purity and properties of the carbon materials are a function of its preparation method, and variation of the preparation parameters may yield carbon materials having different properties. Accordingly, in some embodiments, the ultrapure synthetic carbon material or ultrapure synthetic amorphous carbon material is a pyrolyzed dried ultrapure polymer gel, for example, a pyrolyzed ultrapure polymer cryogel, a pyrolyzed ultrapure polymer xerogel or a pyrolyzed ultrapure polymer aerogel. In other embodiments, the ultrapure synthetic carbon material or ultrapure synthetic amorphous carbon material is activated (i.e., an ultrapure synthetic activated carbon material). For example, in further embodiments the ultrapure synthetic carbon material or ultrapure synthetic amorphous carbon material is an activated dried ultrapure polymer gel, an activated ultrapure polymer cryogel, an activated ultrapure polymer xerogel or an activated ultrapure polymer aerogel.

The ultrapure synthetic carbon material and ultrapure synthetic amorphous carbon material comprise low total PIXE impurities. Thus, in some embodiments the total PIXE impurity content in the ultrapure synthetic carbon material or ultrapure synthetic amorphous carbon material (as measured by proton induced x-ray emission) is less than 1000 ppm. In other embodiments, the total PIXE impurity content in the ultrapure synthetic carbon material or ultrapure synthetic amorphous carbon material is less than 800 ppm, less than 500 ppm, less than 300 ppm, less than 200 ppm, less than 150 ppm, less than 100 ppm, less than 50 ppm, less than 25 ppm, less than 10 ppm, less than 5 ppm or less than 1 ppm. In further embodiments of the foregoing, the ultrapure synthetic carbon material or ultrapure synthetic amorphous carbon material is a pyrolyzed dried ultrapure polymer gel, a pyrolyzed ultrapure polymer cryogel, a pyrolyzed ultrapure polymer xerogel, a pyrolyzed ultrapure polymer aerogel, an activated dried ultrapure polymer gel, an activated ultrapure polymer cryogel, an activated ultrapure polymer xerogel or an activated ultrapure polymer aerogel.

In addition to low PIXE impurity content, certain embodiments of the disclosed carbon materials comprise high total carbon content. In addition to carbon, the ultrapure synthetic carbon material and ultrapure synthetic amorphous carbon material may also comprise oxygen, hydrogen and nitrogen. In some embodiments, the ultrapure synthetic carbon material or ultrapure synthetic amorphous carbon material comprises at least 85% carbon, at least 90% carbon, at least 95% carbon, at least 96% carbon, at least 97% carbon, at least 98% carbon or at least 99% carbon on a weight/weight basis. In some other embodiments, the ultrapure synthetic carbon material or ultrapure synthetic amorphous carbon material comprises less than 10% oxygen, less than 5% oxygen, less than 3.0% oxygen, less than 2.5% oxygen, less than 1% oxygen or less than 0.5% oxygen on a weight/weight basis. In other embodiments, the ultrapure synthetic carbon material or ultrapure synthetic amorphous carbon material comprises less than 10% hydrogen, less than 5% hydrogen, less than 2.5% hydrogen, less than 1% hydrogen, less than 0.5% hydrogen or less than 0.1% hydrogen on a weight/weight basis. In other embodiments, the ultrapure synthetic carbon material or ultrapure synthetic amorphous carbon material comprises less than 5% nitrogen, less than 2.5% nitrogen, less than 1% nitrogen, less than 0.5% nitrogen, less than 0.25% nitrogen or less than 0.01% nitrogen on a weight/weight basis. The oxygen, hydrogen and nitrogen content of the disclosed carbon materials can be determined by combustion analysis. Techniques for determining elemental composition by combustion analysis are well known in the art.

The total ash content of a carbon material may, in some instances, have an effect on the gas storage of a carbon material. Accordingly, in some embodiments, the ash content of the ultrapure synthetic carbon material or ultrapure synthetic amorphous carbon material ranges from 0.1% to 0.001%, for example in some specific embodiments the ash content of the ultrapure synthetic carbon material or ultrapure synthetic amorphous carbon material is less than 0.1%, less than 0.08%, less than 0.05%, less than 0.03%, than 0.025%, less than 0.01%, less than 0.0075%, less than 0.005% or less than 0.001%.

In other embodiments, the ultrapure synthetic carbon material or ultrapure synthetic amorphous carbon material has a total PIXE impurity content of less than 500 ppm and an ash content of less than 0.08%. In further embodiments, the ultrapure synthetic carbon material or ultrapure synthetic amorphous carbon material has a total PIXE impurity content of less than 300 ppm and an ash content of less than 0.05%. In other further embodiments, the ultrapure synthetic carbon material or ultrapure synthetic amorphous carbon material has a total PIXE impurity content of less than 200 ppm and an ash content of less than 0.05%. In other further embodiments, the ultrapure synthetic carbon material or ultrapure synthetic amorphous carbon material has a total PIXE impurity content of less than 200 ppm and an ash content of less than 0.025%. In other further embodiments, the ultrapure synthetic carbon material or ultrapure synthetic amorphous carbon material has a total PIXE impurity content of less than 100 ppm and an ash content of less than 0.02%. In other further embodiments, the ultrapure synthetic carbon material or ultrapure synthetic amorphous carbon material has a total PIXE impurity content of less than 50 ppm and an ash content of less than 0.01%.

The amount of individual PIXE impurities present in the disclosed carbon materials can be determined by proton induced x-ray emission. Individual PIXE impurities may contribute in different ways to the overall gas storage performance of the disclosed carbon materials. Thus, in some embodiments, the level of sodium present in the ultrapure synthetic carbon material or ultrapure synthetic amorphous carbon material is less than 1000 ppm, less than 500 ppm, less than 100 ppm, less than 50 ppm, less than 10 ppm, or less than 1 ppm. In some embodiments, the level of magnesium present in the ultrapure synthetic carbon material or ultrapure synthetic amorphous carbon material is less than 1000 ppm, less than 100 ppm, less than 50 ppm, less than 10 ppm, or less than 1 ppm. In some embodiments, the level of aluminum present in the ultrapure synthetic carbon material or ultrapure synthetic amorphous carbon material is less than 1000 ppm, less than 100 ppm, less than 50 ppm, less than 10 ppm, or less than 1 ppm. In some embodiments, the level of silicon present in the ultrapure synthetic carbon material or ultrapure synthetic amorphous carbon material is less than 500 ppm, less than 300 ppm, less than 100 ppm, less than 50 ppm, less than 20 ppm, less than 10 ppm or less than 1 ppm. In some embodiments, the level of phosphorous present in the ultrapure synthetic carbon material or ultrapure synthetic amorphous carbon material is less than 1000 ppm, less than 100 ppm, less than 50 ppm, less than 10 ppm, or less than 1 ppm. In some embodiments, the level of sulfur present in the ultrapure synthetic carbon material or ultrapure synthetic amorphous carbon material is less than 1000 ppm, less than 100 ppm, less than 50 ppm, less than 30 ppm, less than 10 ppm, less than 5 ppm or less than 1 ppm. In some embodiments, the level of chlorine present in the ultrapure synthetic carbon material or ultrapure synthetic amorphous carbon material is less than 1000 ppm, less than 100 ppm, less than 50 ppm, less than 10 ppm, or less than 1 ppm. In some embodiments, the level of potassium present in the ultrapure synthetic carbon material or ultrapure synthetic amorphous carbon material is less than 1000 ppm, less than 100 ppm, less than 50 ppm, less than 10 ppm, or less than 1 ppm. In other embodiments, the level of calcium present in the ultrapure synthetic carbon material or ultrapure synthetic amorphous carbon material is less than 100 ppm, less than 50 ppm, less than 20 ppm, less than 10 ppm, less than 5 ppm or less than 1 ppm. In some embodiments, the level of chromium present in the ultrapure synthetic carbon material or ultrapure synthetic amorphous carbon material is less than 1000 ppm, less than 100 ppm, less than 50 ppm, less than 10 ppm, less than 5 ppm, less than 4 ppm, less than 3 ppm, less than 2 ppm or less than 1 ppm. In other embodiments, the level of iron present in the ultrapure synthetic carbon material or ultrapure synthetic amorphous carbon material is less than 50 ppm, less than 20 ppm, less than 10 ppm, less than 5 ppm, less than 4 ppm, less than 3 ppm, less than 2 ppm or less than 1 ppm. In other embodiments, the level of nickel present in the ultrapure synthetic carbon material or ultrapure synthetic amorphous carbon material is less than 20 ppm, less than 10 ppm, less than 5 ppm, less than 4 ppm, less than 3 ppm, less than 2 ppm or less than 1 ppm. In some other embodiments, the level of copper present in the ultrapure synthetic carbon material or ultrapure synthetic amorphous carbon material is less than 140 ppm, less than 100 ppm, less than 40 ppm, less than 20 ppm, less than 10 ppm, less than 5 ppm, less than 4 ppm, less than 3 ppm, less than 2 ppm or less than 1 ppm. In yet other embodiments, the level of zinc present in the ultrapure synthetic carbon material or ultrapure synthetic amorphous carbon material is less than 20 ppm, less than 10 ppm, less than 5 ppm, less than 2 ppm or less than 1 ppm. In yet other embodiments, the sum of all PIXE impurities, excluding sodium, magnesium, aluminum, silicon, phosphorous, sulphur, chlorine, potassium, calcium, chromium, iron, nickel, copper and zinc, present in the ultrapure synthetic carbon material or ultrapure synthetic amorphous carbon material is less than 1000 ppm, less than 500 pm, less than 300 ppm, less than 200 ppm, less than 100 ppm, less than 50 ppm, less than 25 ppm, less than 10 ppm or less than 1 ppm. As noted above, in some embodiments other impurities such as hydrogen, oxygen and/or nitrogen may be present in levels ranging from less than 10% to less than 0.01%.

In some embodiments, the ultrapure synthetic carbon material or ultrapure synthetic amorphous carbon material comprises PIXE impurities near or below the detection limit of the proton induced x-ray emission analysis. For example, in some embodiments the ultrapure synthetic carbon material or ultrapure synthetic amorphous carbon material comprises less than 50 ppm sodium, less than 15 ppm magnesium, less than 10 ppm aluminum, less than 8 ppm silicon, less than 4 ppm phosphorous, less than 3 ppm sulfur, less than 3 ppm chlorine, less than 2 ppm potassium, less than 3 ppm calcium, less than 2 ppm scandium, less than 1 ppm titanium, less than 1 ppm vanadium, less than 0.5 ppm chromium, less than 0.5 ppm manganese, less than 0.5 ppm iron, less than 0.25 ppm cobalt, less than 0.25 ppm nickel, less than 0.25 ppm copper, less than 0.5 ppm zinc, less than 0.5 ppm gallium, less than 0.5 ppm germanium, less than 0.5 ppm arsenic, less than 0.5 ppm selenium, less than 1 ppm bromine, less than 1 ppm rubidium, less than 1.5 ppm strontium, less than 2 ppm yttrium, less than 3 ppm zirconium, less than 2 ppm niobium, less than 4 ppm molybdenum, less than 4 ppm, technetium, less than 7 ppm rubidium, less than 6 ppm rhodium, less than 6 ppm palladium, less than 9 ppm silver, less than 6 ppm cadmium, less than 6 ppm indium, less than 5 ppm tin, less than 6 ppm antimony, less than 6 ppm tellurium, less than 5 ppm iodine, less than 4 ppm cesium, less than 4 ppm barium, less than 3 ppm lanthanum, less than 3 ppm cerium, less than 2 ppm praseodymium, less than 2 ppm, neodymium, less than 1.5 ppm promethium, less than 1 ppm samarium, less than 1 ppm europium, less than 1 ppm gadolinium, less than 1 ppm terbium, less than 1 ppm dysprosium, less than 1 ppm holmium, less than 1 ppm erbium, less than 1 ppm thulium, less than 1 ppm ytterbium, less than 1 ppm lutetium, less than 1 ppm hafnium, less than 1 ppm tantalum, less than 1 ppm tungsten, less than 1.5 ppm rhenium, less than 1 ppm osmium, less than 1 ppm iridium, less than 1 ppm platinum, less than 1 ppm silver, less than 1 ppm mercury, less than 1 ppm thallium, less than 1 ppm lead, less than 1.5 ppm bismuth, less than 2 ppm thorium, or less than 4 ppm uranium.

In some specific embodiments, the ultrapure synthetic carbon material or ultrapure synthetic amorphous carbon material comprises less than 100 ppm sodium, less than 300 ppm silicon, less than 50 ppm sulfur, less than 100 ppm calcium, less than 20 ppm iron, less than 10 ppm nickel, less than 140 ppm copper, less than 5 ppm chromium and less than 5 ppm zinc as measured by proton induced x-ray emission. In other specific embodiments, the ultrapure synthetic carbon material or ultrapure synthetic amorphous carbon material comprises less than 50 ppm sodium, less than 30 ppm sulfur, less than 100 ppm silicon, less than 50 ppm calcium, less than 10 ppm iron, less than 5 ppm nickel, less than 20 ppm copper, less than 2 ppm chromium and less than 2 ppm zinc.

In other specific embodiments, the ultrapure synthetic carbon material or ultrapure synthetic amorphous carbon material comprises less than 50 ppm sodium, less than 50 ppm silicon, less than 30 ppm sulfur, less than 10 ppm calcium, less than 2 ppm iron, less than 1 ppm nickel, less than 1 ppm copper, less than 1 ppm chromium and less than 1 ppm zinc.

In some other specific embodiments, the ultrapure synthetic carbon material or ultrapure synthetic amorphous carbon material comprises less than 100 ppm sodium, less than 50 ppm magnesium, less than 50 ppm aluminum, less than 10 ppm sulfur, less than 10 ppm chlorine, less than 10 ppm potassium, less than 1 ppm chromium and less than 1 ppm manganese.

In certain embodiments, the carbon material comprises an acidic pH, for example a pH between 4 and 6. In other embodiments, the carbon material comprises a neutral pH, for example between pH 6 and 8. In yet other embodiments, the carbon comprises a basic pH, for example, between pH 8 and 10. For the instance where the gas to be adsorbed on the carbon material is incapable of forming hydrogen bonds with the carbon, for example methane, a preferred embodiment may be where the carbon has relatively low acidity and thus polarity, in order words where the carbon comprises a neutral or basic pH. Carbon materials comprising a neutral pH may be preferred for minimizing water uptake and water contamination in the carbon material.

In order to further enhance the gas storage capability of the carbon materials, alternate surface functionalities are incorporated in certain embodiments, including, but not limited to nitrogen, sulfur, boron, or combinations thereof. In certain embodiments, the carbon material is in the form of a monolith. In this regard, the monolith may be achieved by compression of carbon particles, either in the presence or absence of binder particles. In another embodiment, the carbon material is placed into a mold, either in absence or presence of binder material. Suitable binder particles in this regard include, but are not limited to, carbon blacks, carbon fibers, nano-scale carbon materials such as carbon nanofibers or nanotubes, polymers such as polytetrafluoroethylene, styrene butadiene rubber, Lico, CMC, PVDF novalac, and the like. Resins which are converted to carbon material upon pyrolysis and/or activation are also useful as binders. Such resins can, in some embodiments, be employed in higher concentrations than binders since these resins are often converted to carbon during the process Resins for this purpose include the above described resorcinol/formaldehyde or phenol/formaldehyde resins, solid state resins such as BPA/HMT, sugar, sugar/citric acid, novolac and Novolac PEG. In some embodiments, the binder is present (in wt %) from 0.1% to 50%, for example 0.2% to 25%, for example from 0.4 to 20%, for example from 0.5% to 10%, for example 1% to 5%. In other embodiments, the binder is present (in volume %) from 0.1% to 50%, for example 0.2% to 25%, for example from 0.4 to 20%, for example from 0.5% to 10%, for example 1% to 5%. In certain embodiments, the binder is in the form of a phenol resin, for example novolac or resol type resins, or other polymeric resin suitable as a precursor for carbon. In this context, the polymeric binder can remain as a polymer material in the monolith, or the monolith can be pyrolyzed or pyrolyzed and activated; in this case, the binder is present as either pyrolyzed or activated carbon. The monolith can be coated, for example with a polymeric material. The polymeric coating material may be gas-permeable or selectively gas permeable. The coating can be various polymer types, for example phenolic resin type or epoxy type. For the example where a mold is use to form the monolith, the mold may be epoxy lined, for example.

Accordingly, certain embodiments are directed to a method for preparation of a monolith comprising any of the above described carbon materials, the method comprising preparing a blend of carbon particles and an optional binding material and applying a force to the blend. In some embodiments, the method further comprises heating the blend before or after, or both, applying the force. In other embodiments, the method further comprises pyrolyzing the monolith by heating in an inert atmosphere. In other embodiments the method further comprises activating the monolith by heating in a CO2 atmosphere. In some embodiment, the monolith is a pellet. In other embodiments, the blend comprises a binder. In different embodiments, the blend does not comprise a binder. In some embodiments, the force ranges from about 1 to about 2 standard tons. In different embodiments, heating comprises heating to a temperature from about 100 to about 150 C. In some embodiments, the binder is selected from novolac, novolac PEG, lico, CMC (carboxymethylcellulose) and PVDF (polyvinylidene fluoride). In other embodiments, the binder is selected from resorcinol/formaldehyde and phenol/formaldehyde resins, BPA/HMT, sugar, sugar/citric acid, novolac and Novolac PEG.

In certain embodiments, the monolith is achieved by using a mold for the carbon precursors and slowly ramping the material inside the mold through a controlled temperature ramp up to the final pyrolysis temperature. In one embodiment, the material in a mold is ramped at a rate of 1-100 C/min until 100-200 C and then held for 0-18 h. For this ramp, the material may be non-compressed or compressed at a range of force of 0.1-8 Nm. In other embodiments, the material is further heated at a rate of 0.1-50 C/min from 100-200 C to 200-350 C, and held for 0-18 h. For this further heating ramp, the material may be non-compressed or compressed at a range of force of 0.1-8 Nm. In further embodiments, the material may be heated in increments of 5-100 C at a ramp rate of 0.1-50 C/min, with hold at each increment from 0-18 h, wherein the material may be non-compressed, or compressed at a range of force from 0.1-8 nM for each incremental step. The certain embodiments the final incremental step has a final temperature of 600-900 C, a dwell time of 1-60 min, and the material may be non-compressed or compressed at a range of force of 0.1-8 Nm. In certain embodiments discussed above, various gases are employed for the various process steps, ramps, and hold (dwells), wherein exemplary gases are air, nitrogen, carbon dioxide, and the like, or combinations thereof. In preferred embodiments, for steps, ramps, and holds (dwells) above 200 C, the gas used in nitrogen. In further preferred embodiments, for steps, ramps, and holds (dwells) above 350 C, the gas used in nitrogen. preferred embodiments, for steps, ramps, and holds (dwells) above 400 C, the gas used in nitrogen. In certain embodiments, the pyrolyzed material is removed from the mold in one piece to yield a monolith.

In certain embodiments, the binder comprises a macroporous foam. In some of these embodiments, the macroporous foam comprises pyrolyzed carbon, activated carbon, or a mixture thereof. The monolith geometry can be varied, for example can be in the form of spheres, cylinders, pellets, prisms (for example rectangular prism, triangular prism), cones, or the like.

Carbon materials for use in gas adsorption may be prepared according to any number of methods. In one embodiment, the disclosed carbon materials are prepared by a sol gel process wherein a polymer gel is prepared by polymerization of one or more polymer precursors. The resulting polymer gel is then dried, for example by rapidly freezing polymer gel particles followed by lyophilization. The dried polymer gel is then pyrolyzed and optionally activated. The carbon sample thus obtained may then be milled to obtain a desired particle size distribution and then blended at a predetermined ratio with one or more other carbon samples having different particle size distributions to obtain a carbon material having enhanced packing properties. Similar methods of milling and blending may be employed with other types of energy storage particles to enhance the packing properties, and thus volumetric performance, of the same. Details of the preparation of carbon materials of the various embodiments are described below and in co-owned U.S. Pat. Nos. 7,723,262 and 8,404,384, both of which are hereby incorporated by reference in their entirety.

The polymer gels may be prepared by a sol gel process. For example, the polymer gel may be prepared by co-polymerizing one or more polymer precursors in an appropriate solvent. In one embodiment, the one or more polymer precursors are co-polymerized under acidic conditions. In some embodiments, a first polymer precursor is a phenolic compound and a second polymer precursor is an aldehyde compound. In another embodiment of the method, the phenolic compound is resorcinol, catechol, hydroquinone, phloroglucinol, phenol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phloroglucinol, phenol or a combination thereof, and the aldehyde compound is formaldehyde. In yet further embodiments, the phenolic compound is resorcinol and the aldehyde compound is formaldehyde.

The sol gel polymerization process is generally performed under catalytic conditions. Accordingly, in some embodiments, preparing the polymer gel comprises co-polymerizing one or more polymer precursors in the presence of a catalyst. In some embodiments, the catalyst comprises a basic volatile catalyst. For example, in one embodiment, the basic volatile catalyst comprises ammonium carbonate, ammonium bicarbonate, ammonium acetate, ammonium hydroxide, or combinations thereof. In a further embodiment, the basic volatile catalyst is ammonium carbonate. In another further embodiment, the basic volatile catalyst is ammonium acetate.

The molar ratio of catalyst to phenolic compound may have an effect on the final properties of the polymer gel as well as the final properties of the carbon materials prepared therefrom. Thus, in some embodiments such catalysts are used in the range of molar ratios of 10:1 to 2000:1 phenolic compound:catalyst. In some embodiments, such catalysts can be used in the range of molar ratios of 20:1 to 200:1 phenolic compound:catalyst. For example in other embodiments, such catalysts can be used in the range of molar ratios of 25:1 to 100:1 phenolic compound:catalyst.

The reaction solvent is another process parameter that may be varied to obtain the desired properties of the polymer gels and carbon materials prepared therefrom. In some embodiments, the solvent for preparation of the polymer gel is a mixed solvent system of water and a miscible co-solvent. For example, in certain embodiments the solvent comprises a water miscible acid. Examples of water miscible acids include, but are not limited to, propionic acid, acetic acid, and formic acid. In further embodiments, the solvent comprises a ratio of water-miscible acid to water of 99:1, 90:10, 75:25, 50:50, 25:75, 10:90 or 1:90. In other embodiments, acidity is provided by adding a solid acid to the reaction solvent.

In some other embodiments of the foregoing, the solvent for preparation of the polymer gel is acidic. For example, in certain embodiments the solvent comprises acetic acid. For example, in one embodiment, the solvent is 100% acetic acid. In other embodiments, a mixed solvent system is provided, wherein one of the solvents is acidic. For example, in one embodiment of the method, the solvent is a binary solvent comprising acetic acid and water. In further embodiments, the solvent comprises a ratio of acetic acid to water of 99:1, 90:10, 75:25, 50:50, 25:75, 10:90 or 1:90. In other embodiments, acidity is provided by adding a solid acid to the reaction solvent.

In some embodiments of the methods described herein, the molar ratio of phenolic precursor to catalyst is from about 10:1 to about 2000:1 or the molar ratio of phenolic precursor to catalyst is from about 20:1 to about 200:1. In further embodiments, the molar ratio of phenolic precursor to catalyst is from about 25:1 to about 100:1. In further embodiments, the molar ratio of phenolic precursor to catalyst is from about 25:1 to about 50:1. In further embodiments, the molar ratio of phenolic precursor to catalyst is from about 100:1 to about 50:1.

In the specific embodiment wherein one of the polymer precursors is resorcinol and another polymer precursor is formaldehyde, the resorcinol to catalyst ratio can be varied to obtain the desired properties of the resultant polymer gel and carbon materials prepared therefrom. In some embodiments of the methods described herein, the molar ratio of resorcinol to catalyst is from about 10:1 to about 2000:1 or the molar ratio of resorcinol to catalyst is from about 20:1 to about 200:1. In further embodiments, the molar ratio of resorcinol to catalyst is from about 25:1 to about 100:1. In further embodiments, the molar ratio of resorcinol to catalyst is from about 25:1 to about 50:1. In further embodiments, the molar ratio of resorcinol to catalyst is from about 100:1 to about 50:1.

Polymerization to form a polymer gel can be accomplished by various means described in the art. For instance, polymerization can be accomplished by incubating suitable polymer precursor materials in the presence of a suitable catalyst for a period of time. The time for polymerization can be a period ranging from minutes or hours to days, depending on temperature (the higher the temperature the faster, the reaction rate, and correspondingly, the shorter the time required). The polymerization temperature can range from room temperature to a temperature approaching (but lower than) the boiling point of the starting solution. For example, the temperature can range from about 20° C. to about 90° C. In the specific embodiment wherein one polymer precursor is resorcinol and one polymer precursor is formaldehyde, the temperature can range from about 20° C. to about 100° C., typically from about 25° C. to about 90° C. In some embodiments, polymerization can be accomplished by incubation of suitable synthetic polymer precursor materials in the presence of a catalyst for at least 24 hours at about 90° C. Generally polymerization can be accomplished in between about 6 and about 24 hours at about 90° C., for example between about 18 and about 24 hours at about 90° C.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species. The relative amounts of alcohol-containing species (e.g. alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to carbonyl species may be selected so that the total moles of reactive alcohol groups in the alcohol containing species is approximately the same as the total moles of reactive carbonyl groups in the carbonyl species. The same general 1:1 molar ratio holds true when the carbonyl-containing species comprises a combination of an aldehyde species and a carbonyl species.

The total solids content in the aqueous solution prior to polymer gel formation can be varied. The weight ratio of resorcinol to water is from about 0.05 to 1 to about 0.70 to 1. Alternatively, the ratio of resorcinol to water is from about 0.15 to 1 to about 0.6 to 1. Alternatively, the ratio of resorcinol to water is from about 0.15 to 1 to about 0.35 to 1. Alternatively, the ratio of resorcinol to water is from about 0.25 to 1 to about 0.5 to 1. Alternatively, the ratio of resorcinol to water is from about 0.3 to 1 to about 0.4 to 1.

Examples of solvents useful in the preparation of the polymer gels disclosed herein include but are not limited to water or alcohol such as, for example, ethanol, t-butanol, methanol or mixtures of these, optionally further with water. Such solvents are useful for dissolution of the polymer precursor materials, for example dissolution of the phenolic compound. In addition, in some processes such solvents are employed for solvent exchange in the polymer gel (prior to freezing and drying), wherein the solvent from the polymerization of the precursors, for example, resorcinol and formaldehyde, is exchanged for a pure alcohol. In one embodiment of the present application, a polymer gel is prepared by a process that does not include solvent exchange.

Suitable catalysts in the preparation of polymer gels include volatile basic catalysts that facilitate polymerization of the precursor materials into a monolithic polymer. The catalyst can also comprise various combinations of the catalysts described above. In embodiments comprising phenolic compounds, such catalysts can be used in the range of molar ratios of 20:1 to 200:1 phenolic compound:catalyst. For example, in some specific embodiments such catalysts can be used in the range of molar ratios of 25:1 to 100:1 phenolic compound:catalyst.

In some embodiments, the resulting monolithic polymer gel is not disrupted but retained as a monolith. In certain embodiments, the monolithic polymer gel is reinforced with for example, carbon fiber, carbon nanotubes, graphene sheets, or other fibrous materials.

In other embodiments, the monolithic polymer gel is physically disrupted to create smaller particles according to various techniques known in the art. The resultant polymer gel particles generally have an average diameter of less than about 30 mm, for example, in the size range of about 1 mm to about 25 mm, or between about 1 mm to about 5 mm or between about 0.5 mm to about 10 mm. Alternatively, the size of the polymer gel particles can be in the range below about 1 mm, for example, in the size range of about 10 to 1000 microns. Techniques for creating polymer gel particles from monolithic material include manual or machine disruption methods, such as sieving, grinding, milling, or combinations thereof. Such methods are well-known to those of skill in the art. Various types of mills can be employed in this context such as roller, bead, and ball mills and rotary crushers and similar particle creation equipment known in the art.

In a specific embodiment, a roller mill is employed. A roller mill has three stages to gradually reduce the size of the gel particles. The polymer gels are generally very brittle for a 'wet' material and are not damp to the touch. Consequently they are easily milled using this approach, however, the width of each stage must be set appropriately to achieve the targeted final mesh. This adjustment is made and validated for each combination of gel recipe and mesh size. Each gel is milled via passage through a sieve of known mesh size. Sieved particles can be temporarily stored in sealed containers.

In one embodiment, a rotary crusher is employed. The rotary crusher has a screen mesh size of about $\frac{1}{8}^{th}$ inch. In another embodiment, the rotary crusher has a screen mesh size of about ⅜$^{th}$ inch. In another embodiment, the rotary crusher has a screen mesh size of about ⅝$^{th}$ inch. In another embodiment, the rotary crusher has a screen mesh size of about ⅜$^{th}$ inch.

Milling can be accomplished at room temperature according to methods well known to those of skill in the art. Alternatively, milling can be accomplished cryogenically, for example by co-milling the polymer gel with solid carbon dioxide (dry ice) particles. In this embodiment, the two steps of (a) creating particles from the monolithic polymer gel and (b) rapid, multidirectional freezing of the polymer gel are accomplished in a single process.

In another embodiment, the polymer gel particles can be prepared by employing a suspension or emulsions process. Details of the preparation of polymer gel particles via emulsion or suspension processes and subsequent production of carbon therefrom are described below and in co-owned U.S. patent application Ser. No. 13/763,460 and U.S. patent application Ser. No. 13/763,448 both of which are hereby incorporated by reference in their entirety.

As noted above, one embodiment of the present disclosure provides methods for preparation of polymer gels and carbon materials. For example, in one embodiment the present application provides a method for preparing a condensation polymer gel via an emulsion or suspension process, the method comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In another embodiment, the disclosed methods include preparing a dried condensation polymer gel, the method comprises drying a condensation polymer gel, wherein the condensation polymer gel has been prepared by an emulsion or suspension process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

In yet other embodiments, the invention provides a method for preparing a carbon material, the method comprising heating condensation polymer gel particles to obtain a carbon material, wherein the condensation polymer gel particles have been prepared by a process comprising:

a) preparing a mixture comprising a continuous phase and a polymer phase, wherein the polymer phase comprises one or more polymer precursors and an optional solvent; and b) aging the mixture at a temperature and for a time sufficient for the one or more polymer precursors to react with each other and form a condensation polymer gel.

The condensation polymer gel may be used without drying or the methods may further comprise drying the condensation polymer gel. In certain embodiments of the foregoing methods, the polymer gel is dried by freeze drying.

The inventive methods are useful for preparation of condensation polymer gels and/or carbon materials having any number of various pore structures. In this regard, Applications have discovered that the pore structure can be controlled by variation of any number of process parameters such as continuous phase-type, stir rate, temperature, aging time, etc. In some embodiments, the condensation polymer gel is microporous, and in other embodiments the condensation polymer gel is mesoporous. In certain other embodiments, the condensation polymer gel comprises a pore structure having a mixture of microporous and mesoporous pores.

In related embodiments, the carbon material is microporous or the carbon material is mesoporous. In other embodiments, the carbon material comprises a pore structure having mixture of microporous and mesoporous pores.

The polymer phase may be prepared by admixing the one or more polymer precursors and the optional solvent, and in some examples the mixture is prepared by admixing the continuous phase and the polymer phase. The method includes embodiments wherein the mixture is an emulsion, while in other embodiments the mixture is a suspension.

For example, in some embodiments the continuous phase and the polymer phase are not miscible with each other, and the mixture is an emulsion. While in other exemplary methods the continuous phase and the polymer phase are not soluble in each other, and the mixture is a suspension. In other examples, the polymer phase is aged prior to preparation of the mixture, and the mixture is an emulsion and/or a suspension upon combination of the continuous phase and the polymer phase.

In other different aspects, both the continuous phase and the polymer phase are soluble in each other (i.e., miscible). In some variations of this embodiment, the continuous phase and polymer phase are miscible initially but the polymer phase is aged such that it becomes immiscible with the continuous phase and the mixture becomes a suspension upon aging.

The polymer phase may be prepared by admixing the one or more polymer precursors and the optional solvent. In some embodiments, the polymer phase is "pre-reacted" prior to mixing with the continuous phase such the polymer precursors are at least partially polymerized. In other embodiments, the polymer precursors are not pre-reacted. In certain other embodiments, the method is a continuous process. For example, the polymer precursors may be continuously mixed with a continuous phase and the final condensation polymer gel may be continuously isolated from the mixture.

A single polymer precursor may be used or the methods may comprise use of two or more different polymer precursors. The structure of the polymer precursors is not particularly limited, provided that the polymer precursor is capable of reacting with another polymer precursor or with a second polymer precursor to form a polymer. Polymer precursors include amine-containing compounds, alcohol-containing compounds and carbonyl-containing compounds, for example in some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

In one embodiment, the method comprises use of a first and second polymer precursor, and in some embodiments the first or second polymer precursor is a carbonyl containing compound and the other of the first or second polymer precursor is an alcohol-containing compound. In some embodiments, a first polymer precursor is a phenolic compound and a second polymer precursor is an aldehyde compound (e.g., formaldehyde). In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde. In some embodiments, the polymer precursors are alcohols and carbonyl compounds (e.g., resorcinol and aldehyde) and they are present in a ratio of about 0.5:1.0, respectively.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Mixtures of two or more polyhydroxy benzenes can also be used. Phenol (monohydroxy benzene) can also be used. Representative polyhydroxy compounds include sugars, such as glucose, sucrose, chitin and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3-butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species, for example an aldehyde and a phenol. The relative amounts of alcohol-containing species (e.g., alcohols, phenolic compounds and mono- or polyhydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

In certain embodiments, the polymer precursors comprise formaldehyde and resorcinol or formaldehyde and phenol. In other embodiments, the polymer precursors comprise formaldehyde and urea.

In other embodiments, the polymer precursor is a urea or an amine containing compound. For example, in some embodiments the polymer precursor is urea or melamine. Other embodiments include polymer precursors selected from isocyanates or other activated carbonyl compounds such as acid halides and the like.

Some embodiments of the disclosed methods include preparation of polymer gels (and carbon materials) comprising chemical modifiers. In certain embodiments, the chemical modifiers are thought to improve the gas storage properties of the carbon materials. Chemical modifiers include those known in the art and described in co-pending U.S. application Ser. No. 12/965,709, previously incorporated by reference in its entirety. Such chemical modifiers are generally selected from elements useful for modifying the electrochemical properties of the resulting carbon materials or polymer gels, and in some embodiments include nitrogen or silicon. In other embodiments, the chemical modifier comprises nitrogen, iron, tin, silicon, nickel, aluminum or manganese. In some more specific embodiments, the chemical modifier is nitrogen. The chemical modifier can be included in the preparation procedure at any step. For example, in some the chemical modifier is admixed with the mixture, the polymer phase or the continuous phase.

In some embodiments, preparation of the carbon materials includes a step of freezing polymer gel particles. For example, in some cases after the polymer gel particles are formed from the monolithic polymer gel, freezing of the polymer gel particles is accomplished rapidly and in a multi-directional fashion. Freezing slowly and in a unidirectional fashion, for example by shelf freezing in a lyophilizer, results in dried material having a very low surface area. Similarly, snap freezing (i.e., freezing that is accomplished by rapidly cooling the polymer gel particles by pulling a deep vacuum) also results in a dried material having a low surface area. As disclosed herein rapid freezing in a multidirectional fashion can be accomplished by rapidly lowering the material temperature to at least about −10° C. or lower, for example, −20° C. or lower, or for example, to at least about −30° C. or lower. Rapid freezing of the polymer gel particles creates a fine ice crystal structure within the particles due to widespread nucleation of ice crystals, but leaves little time for ice crystal growth. This provides a high specific surface area between the ice crystals and the hydrocarbon matrix, which is necessarily excluded from the ice matrix.

The concept of extremely rapid freezing to promote nucleation over crystal growth can be applied to mixed solvent systems. In one embodiment, as the mixed solvent system is rapidly cooled, the solvent component that predominates will undergo crystallization at its equilibrium melting temperature, with increased concentration of the co-solvent(s) and concomitant further freezing point depression. As the temperature is further lowered, there is increased crystallization of the predominant solvent and concentration of co-solvent(s) until the eutectic composition is reached, at which point the eutectic composition undergoes the transition from liquid to solid without further component concentration nor product cooling until complete freezing is achieved. In the specific case of water and acetic acid (which as pure substances exhibit freezing points of 0° C. and 17° C., respectively), the eutectic composition comprises approximately 59% acetic acid and 41% water and freezes at about −27° C. Accordingly, in one embodiment, the mixed solvent system is the eutectic composition, for example, in one embodiment the mixed solvent system comprises 59% acetic acid and 41% water.

In one embodiment, the frozen polymer gel particles containing a fine ice matrix are lyophilized under conditions designed to avoid collapse of the material and to maintain fine surface structure and porosity in the dried product. Details of the conditions of the lyophilization are provided herein. Generally drying is accomplished under conditions where the temperature of the product is kept below a temperature that would otherwise result in collapse of the product pores, thereby enabling the dried material to retain an extremely high surface area.

One benefit of having an extremely high surface area in the dried product is the improved utility of the polymer gel for the purpose of fabrication of capacitors, energy storage devices, and other energy-related applications. Different polymer gel applications require variations in the pore size distribution such as different levels of micropore volume, mesopore volume, surface area, and pore size. By tuning the various processing parameters of the polymer gel, high pore volumes can be reached at many different pore sizes depending on the desired application.

The structure of the final carbon material is reflected in the structure of the dried polymer gel which in turn is established by the polymer gel properties. These features can be created in the polymer gel using a sol-gel processing approach as described herein, but if care is not taken in removal of the solvent, then the structure is not preserved. It is of interest to both retain the original structure of the polymer gel and modify its structure with ice crystal formation based on control of the freezing process. In some embodiments, prior to drying the aqueous content of the polymer gel is in the range of about 50% to about 99%. In certain embodiments, upon drying the aqueous content of the polymer cryogel is less than about 30%, alternatively less than about 20%, alternatively less than about 10%, alternately less than about 5% or less than about 2.5%.

In an alternate embodiment, the polymer is created from precursors in the solid state (absence of solvent). Details of the preparation of polymer by solid-state processes and subsequent carbon production therefrom are described below and in co-owned U.S. Patent Application 61/786,074.

In one embodiment, the method comprises heating polymer gel particles that were formed in absence of solvent to obtain a carbon material, wherein the polymer has been prepared by a process comprising:
a) blending a mixture of solid and/or liquid polymer precursors; and
b) aging the mixture at a temperature and for a time sufficient to produce a solvent-free polymer network; and
c) pyrolysis or pyrolysis and activation of the solvent-free polymer network to produce tunable carbon In some embodiments, the solvent is present at a level of less than 80% of the total mass of polymer to be processed into carbon, for example less than 70% of the total mass of polymer to be processed, less than 60% of the total mass of polymer to be processed, less than 50% of the total mass of polymer to be processed, less than 40% of the total mass of polymer to be processed, less than 30% of the total mass of polymer to be processed, less than 20% of the total mass of polymer to be processed, less than 10% of the total mass of polymer to be processed, less than 1% of the total mass of polymer to be processed, less than 0.1% of the total mass of polymer to be processed, less than 0.01% of the total mass of polymer to be processed. Without being bound by theory, a pyrolyzed carbon yield from a polymeric material can be about 50%. Accordingly, the ratio of pyrolyzed carbon produced per unit mass of polymer processed can be less than about 10, less than about 7, less than about 5, less than about 4, less than about 3, less than about 2.5, less than about 2.1. In some embodiments, the ratio of pyrolyzed carbon produced per unit mass of polymer processed is about 2. In some embodiments, the ratio of pyrolyzed carbon produced per unit mass of polymer processed is less than 2.

The pyrolyzed carbon can be activated, and the ratio of activated carbon to polymer processed is higher than the ratio of pyrolyzed carbon to polymer processed, depending on the level of activation desired. Without being bound by theory, a activated carbon yield from a pyrolyzed carbon material can be about 50%. Accordingly, the ratio of activated carbon produced per unit mass of polymer processed can be less than about 14, less than about 10, less than about 8, less than about 6, less than about 5, less than about 4.5, less than about 4.1. In some embodiments, the ratio of activated carbon produced per unit mass of polymer processed is about 4 or lower.

The structure of the polymer precursors is not particularly limited, provided that the polymer precursor is capable of reacting with another polymer precursor or with a second polymer precursor to form a polymer. Polymer precursors include amine-containing compounds, alcohol-containing compounds and carbonyl-containing compounds, for example in some embodiments the polymer precursors are selected from an alcohol, a phenol, a polyalcohol, a sugar, an alkyl amine, an aromatic amine, an aldehyde, a ketone, a carboxylic acid, an ester, a urea, an acid halide and an isocyanate.

In one embodiment, the method comprises use of a first and second polymer precursor, and in some embodiments the first or second polymer precursor is a carbonyl containing compound and the other of the first or second polymer precursor is an alcohol-containing compound. In some embodiments, a first polymer precursor is a phenolic compound and a second polymer precursor is an aldehyde compound (e.g., formaldehyde). In one embodiment, of the method the phenolic compound is phenol, resorcinol, catechol, hydroquinone, phloroglucinol, or a combination thereof; and the aldehyde compound is formaldehyde, acetaldehyde, propionaldehyde, butyraldehyde, benzaldehyde, cinnamaldehyde, or a combination thereof. In a further embodiment, the phenolic compound is resorcinol, phenol or a combination thereof, and the aldehyde compound is formaldehyde. In yet further embodiments, the phenolic compound is resorcinol and the aldehyde compound is formaldehyde. In some embodiments, the polymer precursors are alcohols and carbonyl compounds (e.g., resorcinol and aldehyde) and they are present in a ratio of about 0.5:1.0, respectively.

The polymer precursor materials as disclosed herein include (a) alcohols, phenolic compounds, and other mono- or polyhydroxy compounds and (b) aldehydes, ketones, and combinations thereof. Representative alcohols in this context include straight chain and branched, saturated and unsaturated alcohols. Suitable phenolic compounds include polyhydroxy benzene, such as a dihydroxy or trihydroxy benzene. Representative polyhydroxy benzenes include resorcinol (i.e., 1,3-dihydroxy benzene), catechol, hydroquinone, and phloroglucinol. Other suitable compounds in this regard are bisphenols, for instance, bisphenol A. Mixtures of two or more polyhydroxy benzenes can also be used. Phenol (monohydroxy benzene) can also be used. Representative polyhydroxy compounds include sugars, such as glucose, sucrose, fructose, chitin and other polyols, such as mannitol. Aldehydes in this context include: straight chain saturated aldeydes such as methanal (formaldehyde), ethanal (acetaldehyde), propanal (propionaldehyde), butanal (butyraldehyde), and the like; straight chain unsaturated aldehydes such as ethenone and other ketenes, 2-propenal (acrylaldehyde), 2-butenal (crotonaldehyde), 3 butenal, and the like; branched saturated and unsaturated aldehydes; and aromatic-type aldehydes such as benzaldehyde, salicylaldehyde, hydrocinnamaldehyde, and the like. Suitable ketones include: straight chain saturated ketones such as propanone and 2 butanone, and the like; straight chain unsaturated ketones such as propenone, 2 butenone, and 3 butenone (methyl vinyl ketone) and the like; branched saturated and unsaturated ketones; and aromatic-type ketones such as methyl benzyl ketone (phenylacetone), ethyl benzyl ketone, and the like. The polymer precursor materials can also be combinations of the precursors described above.

In some embodiments, one polymer precursor is an alcohol-containing species and another polymer precursor is a carbonyl-containing species. The relative amounts of alcohol-containing species (e.g., alcohols, phenolic compounds and mono- or poly-hydroxy compounds or combinations thereof) reacted with the carbonyl containing species (e.g. aldehydes, ketones or combinations thereof) can vary substantially. In some embodiments, the ratio of alcohol-containing species to aldehyde species is selected so that the total moles of reactive alcohol groups in the alcohol-containing species is approximately the same as the total moles of reactive carbonyl groups in the aldehyde species. Similarly, the ratio of alcohol-containing species to ketone species may be selected so that the total moles of reactive alcohol groups in the alcohol containing species is approximately the same as the total moles of reactive carbonyl groups in the ketone species. The same general 1:1 molar ratio holds true when the carbonyl-containing species comprises a combination of an aldehyde species and a ketone species.

In other embodiments, the polymer precursor is a urea or an amine-containing compound. For example, in some embodiments the polymer precursor is urea, melamine, hexamethylenetetramine or combination thereof. Other embodiments include polymer precursors selected from isocyanates or other activated carbonyl compounds such as acid halides and the like.

Some embodiments of the disclosed methods include preparation of polymer gels (and carbon materials) comprising chemical modifiers. Such chemical modifiers include, but are not limited to nitrogen, silicon, and sulfur. In other embodiments, the chemical modifier comprises fluorine, iron, tin, silicon, nickel, aluminum, zinc, sodium, magnesium, lithium, potassium, calcium, phosphorous, or manganese. The chemical modifier can be included in the preparation procedure at any step. For example, in some the chemical modifier is admixed with the mixture, the polymer phase or the continuous phase.

In certain embodiments, the chemical modifier is introduced into an already formed polymer by a solvent-free process. For example, in certain embodiments a polymer gel in particulate form is blended with a nitrogen-containing compound also in particulate form, and the mixture blended under a temperature sufficient to achieve molecular mobility, and hence non-covalent and/or covalent incorporation between the chemical modifier and the polymer gel. In certain embodiments, the chemical modifier is a nitrogen-containing compound, for example, but not limited to, urea or melamine. In certain embodiments, the mixture of polymer gel particles and nitrogen containing compound particles can be held at a temperature at or above the glass transition temperature of polymer gel particles, or the nitrogen containing compound particles, or at a temperature that is at or above the glass transition temperature of both species of particles. In certain embodiments, the mixture of polymer gel particles and nitrogen containing compound particles can be held at a temperature at or above the melting temperature of polymer gel particles, or the nitrogen containing compound particles, or at a temperature that is at or above the melting temperature of both species of particles.

In certain embodiments, the chemical modifier is introduced into an already formed dried polymer by a solvent-free process. For example, in certain embodiments a dried polymer gel in particulate form is blended with a nitrogen containing compound also in particulate form, and the mixture blended under a temperature sufficient to achieve molecular mobility, and hence non-covalent and/or covalent incorporation between the chemical modifier and the dried polymer gel. In certain embodiments, the chemical modifier is a nitrogen-containing compound, for example, but not limited to, urea or melamine. In certain embodiments, the mixture of dried polymer gel particles and nitrogen containing compound particles can be held at a temperature at or above the glass transition temperature of dried polymer gel particles, or the nitrogen containing compound particles, or at a temperature that is at or above the glass transition temperature of both species of particles. In certain embodiments, the mixture of dried polymer gel particles and nitrogen containing compound particles can be held at a temperature at or above the melting temperature of dried polymer gel particles, or the nitrogen containing compound particles, or at a temperature that is at or above the melting temperature of both species of particles.

In some embodiments, the gel polymerization process is performed under catalytic conditions. Accordingly, in some embodiments, the method comprises admixing a catalyst with the solvent-free mixture. In some embodiments, the catalyst is a solid at room temperature and pressure.

In some embodiments, the catalyst is a liquid at room temperature and pressure. In some embodiments, the catalyst is a liquid at room temperature and pressure that does not provide dissolution of one or more of the other polymer precursors.

The blending of one or more polymer precursor components in the absence of solvent can be accomplished by methods described in the art, for example ball milling, jet milling, Fritsch milling, planetary mixing, and other mixing methodologies for mixing or blending solid particles while controlling the process conditions (e.g., temperature). The mixing or blending process can be accomplished before, during, and/or after (or combinations thereof) incubation at the reaction temperature.

Reaction parameters include aging the blended mixture at a temperature and for a time sufficient for the one or more polymer precursors to react with each other and form a polymer. In this respect, suitable aging temperature ranges from about room temperature to temperatures at or near the melting point of one or more of the polymer precursors. In some embodiments, suitable aging temperature ranges from about room temperature to temperatures at or near the glass transition temperature of one or more of the polymer precursors. For example, in some embodiments the solvent free mixture is aged at temperatures from about 20° C. to about 600° C., for example about 20° C. to about 500° C., for example about 20° C. to about 400° C., for example about 20° C. to about 300° C., for example about 20° C. to about 200° C. In certain embodiments, the solvent free mixture is aged at temperatures from about 50 to about 250° C.

The reaction duration is generally sufficient to allow the polymer precursors to react and form a polymer, for example the mixture may be aged anywhere from 1 hour to 48 hours, or more or less depending on the desired result. Typical embodiments include aging for a period of time ranging from about 2 hours to about 48 hours, for example in some embodiments aging comprises about 12 hours and in other embodiments aging comprises about 4-8 hours (e.g., about 6 hours).

In some embodiments, the particle size distribution of the polymer particles exhibit a polydispersity index (Dv,90-Dv, 10)/Dv,50, wherein Dv,10, Dv,50 and Dv,90 are the particle size at 10%, 50% and 90%, respectively of the particle size distribution by volume) less than 1,000, for example less than 100, for example less than 10, for example less than 5, for example less than 3, for example less than 2, for example less than 1.5, for example less than 1. In some embodiments, introduction of aqueous phase to organic phase can be staged such that two or more populations of polymer particle size distribution may be achieved. For example, the final polymer particle distribution achieved may consist of two or more modes, where the ratio between the highest and lowest node is about 1000 or lower, for example about 100 or lower, for example about 50 or lower, for example about 10 or lower, for example about 5 or lower, for example about 2 or lower.

The polymer gels may be further processed by pyrolysis and optional activation. In this respect, either dried or wet polymer gels (i.e., not dried) may be pyrolyzed. The resulting carbon materials comprise a high surface area. For example, in some embodiments of the present disclosure, a carbon material having a specific surface area of at least 150 $m^2/g$, at least 250 $m^2/g$, at least 400 $m^2/g$, at least 500 $m^2/g$, at least 600 $m^2/g$, at least 700 $m^2/g$, at least 800 $m^2/g$, at least 900 $m^2/g$, at least 1000 $m^2/g$, at least 1500 $m^2/g$, at least 2000 $m^2/g$, at least 2400 $m^2/g$, at least 2500 $m^2/g$ or at least 3000 $m^2/g$ is provided.

Generally, in the pyrolysis process, dried polymer gels are weighed and placed in a rotary kiln. The temperature ramp is set at 5° C. per minute, the dwell time and dwell temperature are set; cool down is determined by the natural cooling rate of the furnace. The entire process is usually run under an inert atmosphere, such as a nitrogen environment. Pyrolyzed samples are then removed and weighed. Other pyrolysis processes are well known to those of skill in the art.

In some embodiments, pyrolysis dwell time (i.e., the period of time during which the sample is at the desired temperature) is from about 0 minutes to about 120 minutes, from about 0 minutes to about 60 minutes, from about 0 minutes to about 30 minutes, from about 0 minutes to about 10 minutes, from about 0 to 5 minutes or from about 0 to 1 minute.

Pyrolysis may also be carried out more slowly than described above. For example, in one embodiment the pyrolysis is carried out in about 120 to 480 minutes. In other embodiments, the pyrolysis is carried out in about 120 to 240 minutes.

In some embodiments, pyrolysis dwell temperature ranges from about 500° C. to about 1800° C. In other embodiments pyrolysis dwell temperature ranges from about 550° C. to about 1200° C. In other embodiments pyrolysis dwell temperature ranges from about 600° C. to about 800° C. In other embodiments pyrolysis dwell temperature ranges from about 650° C. to about 900° C.

In some embodiments, the pyrolysis dwell temperature is varied during the course of pyrolysis. In one embodiment, the pyrolysis is carried out in a rotary kiln with separate distinct heating zones, the temperature for each zone is sequentially decreased from the entrance to the exit end of the rotary kiln tube. In one embodiment, the pyrolysis is carried out in a rotary kiln with separate distinct heating zones, the temperature for each zone is sequentially increased from entrance to exit end of the rotary kiln tube.

In some embodiments, the pyrolyzed carbon materials are not further activated, while in other embodiments the carbon materials are further activated to obtain an activated carbon material. Activation time and activation temperature both have a large impact on the performance of the resulting activated carbon material, as well as the manufacturing cost thereof. Increasing the activation temperature and the activation dwell time results in higher activation percentages, which generally correspond to the removal of more material compared to lower temperatures and shorter dwell times. Activation temperature can also alter the pore structure of the carbon where lower temperatures result in more microporous carbon and higher temperatures result in mesoporosity. This is a result of the activation gas diffusion limited reaction that occurs at higher temperatures and reaction kinetic driven reactions that occur at lower temperature. Higher activation percentage often increases performance of the final activated carbon, but it also increases cost by reducing overall yield. Improving the level of activation corresponds to achieving a higher performance product at a lower cost.

Pyrolyzed polymer gels may be activated by contacting the pyrolyzed polymer gel with an activating agent. Many gases are suitable for activating, for example gases which contain oxygen. Non-limiting examples of activating gases include carbon dioxide, carbon monoxide, steam, and oxygen. Activating agents may also include corrosive chemicals such as acids, bases or salts (e.g., phosphoric acid, potassium hydroxide, sodium hydroxide, zinc chloride, etc.). Other activating agents are known to those skilled in the art.

Generally, in the activation process, samples are weighed and placed in a rotary kiln, for which the automated gas control manifold is set to ramp at a 20° C. per minute. Carbon dioxide is introduced to the kiln environment for a period of time once the proper activation temperature has been reached. After activation has occurred, the carbon dioxide is replaced by nitrogen and the kiln is cooled down. Samples are weighed at the end of the process to assess the level of activation. Other activation processes are well known to those of skill in the art. In some of the embodiments disclosed herein, activation temperatures may range from 800° C. to 1300° C. In another embodiment, activation temperatures may range from 800° C. to 1050° C. In another embodiment, activation temperatures may range from about 850° C. to about 950° C. One skilled in the art will recognize that other activation temperatures, either lower or higher, may be employed.

In some embodiments, the activation time is between 1 minute and 48 hours. In other embodiments, the activation time is between 1 minute and 24 hours. In other embodiments, the activation time is between 5 minutes and 24 hours. In other embodiments, the activation time is between 1 hour and 24 hours. In further embodiments, the activation time is between 12 hours and 24 hours. In certain other embodiments, the activation time is between 30 min and 4 hours. In some further embodiments, the activation time is between 1 hour and 2 hours. In some embodiments, the activation time is between 4 hours and 12 hours. In some embodiments the activation time is between 24 hours and 48 hours.

The degree of activation is measured in terms of the mass percent of the pyrolyzed dried polymer gel that is lost during the activation step. In one embodiment of the methods described herein, activating comprises a degree of activation from 5% to 90%; or a degree of activation from 10% to 80%; in some cases activating comprises a degree of activation from 40% to 70%, or a degree of activation from 45% to 65%.

In certain embodiments, the disclosed carbon materials comprise improved particle packing properties. Details are described below and in co-owned U.S. patent application Ser. No. 13/250,430, which is hereby incorporated by reference in its entirety. While not wishing to be bound by theory, it is believed that such improved particle packing is due, at least in part, to the specific particle size distribution of the carbon particles within the carbon material. Carbon samples comprising the desired particle size distributions can be prepared by any number of methods known in the art. In particular, the desired particle size distributions can be obtained by various milling techniques. The particle size distribution obtained from a particular milling operation is a function of the mill type, the parameters of the milling operation and/or the material being milled. The present inventors have found that all of these factors can be controlled to obtain the desired particle size distribution, and thus optimized packing, as described below.

In some embodiments, the disclosed carbon material is milled to an average particle size of about 10 microns. The milling may be performed using a jetmill operating in a nitrogen atmosphere. While not wishing to be bound by theory, it is believed that this fine particle size enhances particle-to-particle conductivity, as well as enabling the production of very thin sheet electrodes. The jetmill essentially grinds the carbon against itself by spinning it inside a disc shaped chamber propelled by high-pressure nitrogen. As the larger particles are fed in, the centrifugal force pushes them to the outside of the chamber. As they grind against each other, the particles migrate towards the center where they eventually exit the grinding chamber once they have reached the appropriate dimensions.

In some embodiments, the desired particle size distribution is obtained by varying the length of time, which the carbon material is subjected to milling conditions. In some other embodiments, rather than increasing the length of the milling operation, the carbon material may be milled in one operation and then isolated. The isolated carbon material may then be milled again under identical or different conditions to obtain a twice-milled carbon material. Such twice-milled carbon materials comprise particle size distributions different (e.g., larger percentage of smaller particles) from carbon samples, which have been milled only once.

Other methods for obtaining the desired particle size distribution of the disclosed carbon materials include: ball milling, cryo-milling, bead milling, crushing and the like. Methods which sort and separate carbon particles having different dimensions, for example sieving or gas classification systems, may also be employed in the practice of the invention. Such methods are well known to those skilled in the art.

In some embodiments of the present disclosure, the carbon material is processed according to the above procedures to obtain a particle size distribution comprising carbon particles with volume average particle size (Dv,50) between 0.1 um and 50 mm. In some embodiments, the Dv,50 is between 1 um and 10 um. In some embodiments, the Dv,50 is between 5 um and 20 um. In some embodiments, the Dv,50 is between 10 um and 100 um. In some embodiments, the Dv,50 is about 100 um. In some embodiments, the Dv,50 is between 100 um and 1 mm. In some embodiments, the Dv,50 is about 1 mm. In some embodiments, the Dv,50 is between 1 mm and 10 mm.

Such particle size distributions can be determined using any number of techniques known to those skilled in the art. In one particular embodiment, the particle size distribution is determined by laser diffraction techniques. For example, the carbon particles may be suspended in an aqueous solution and the particle size distribution determined by laser diffraction.

While the above description uses activated carbon particles as an example, one skilled in the art will recognize that analogous processes may be employed to prepare other gas adsorbing particles comprising improved packing properties.

The present inventors have discovered that the density (i.e., particle packing) of carbon materials can be improved by blending different particle size distributions obtained from different carbon materials and/or from different milling operations. Since the particle size distributions in these various carbon materials can be different (e.g., location of the peak size and/or the spread between minimum and maximum particle size), blending of different carbon materials comprising different particle size distributions to obtain optimized packing can be quite difficult. The present inventors have solved this problem by employing computer aided application of the modified Andreasson equation (Eq. 2) for blending two or more carbon samples comprising different particle size distributions to improve the packing and hence the volumetric performance of a capacitor comprising the blended carbon material. Such techniques and resulting carbon materials represent improvements over known techniques and carbon materials.

By controlling the particle size distribution of the carbon particles, enhanced packing of the particles can be achieved. To this end, a number of different models have been proposed for the optimum packing of multisized particles. Two equations in this regard are the formulas provided by Furnas (C. C. Furnas, "Grading Aggregates: I", Ind. Eng. Chem. 23:1052-58, 1931; F. O. Anderegg, "Grading Aggregates: II", Ind. Eng. Chem. 23:1058-64), and Andreassen (A. H. M. Andreassen and J. Andersen, Kolloid Z. 50:217-228, 1931). Furnas' equation assumes the addition of particles of smaller and smaller size, while Andreassen's equation assumes the addition of particles of larger and larger size. Further, since the Furnas equation provides a theoretical distribution, while that of Andreassen is semi-empirical, the Andreassen equation has been criticized for implying an infinite distribution with no minimum particle size.

To address this shortcoming, a modified equation has been developed that links the Furnas and Andreassen equations, referred to as the "modified Andreassen equation" or the "Dinger-Funk equation" (D. R. Dinger and J. E. Funk, Interceram 41(5):332-334, 1992). While the Andreassen equation gives a straight line on a logarithmic plot, the modified Andreessen equation gives a downward curvature since it takes into account a minimum particle size ($d_m$) of the distribution. The Andreassen equation (1) and the modified Andreassen equation (2) are presented below:

$$CPFT = \left(\frac{d}{D}\right)^q * 100 \quad \text{(Eq. 1)}$$

$$CPFT = \frac{(d^q - d_m^q)}{(D^q - d_m^q)} * 100 \quad \text{(Eq. 2)}$$

wherein
CPFT=Cumulative Percent Finer Than (Cumulative Finer Volume
d=Particle size;
$d_m$=Minimum particle size of the distribution;
D=Maximum particle size; and
q=Distribution coefficient ("q-value").

It should be noted that the above minimum particle size distributions are based on volumes. This requires that mixtures of powders with different densities be converted to volumes in order to give volume percent. An important feature of the modified Andreassen equation is influence of the q-value on packing. By computer simulations, the modified Andreassen equation describes 100% packing density for infinite distributions when the q-value is 0.37 or lower (D. R. Dinger and J. E. Funk, Interceram 42(3):150-152, 1993). Of course, as has also been described in the art, real-world systems are finite, and thus 100% packing density is only achievable in theory. For q-values about 0.37, some degree of porosity will be present. Thus, for optimum packing the q-value should not exceed 0.37 and typically ranges from 0.30 to 0.37 for densely packed materials.

One method for accessing the particle packing properties of a carbon material, or other energy storage material, is to compare a plot of the cumulative finer volume distribution vs. particle size for the carbon material to the modified Andreassen equation curve. The correlation coefficient (i.e., R value) of the carbon material curve relative to the modified Andreassen equation curve is an indicator of the extent of packing optimization within the carbon material. A correlation coefficient of 1.0 relative to the modified Andreassen equation curve would indicate that optimum packing of the carbon particles within the carbon material has been achieved. Accordingly, in one embodiment, the correlation coefficient of a plot of the cumulative finer volume distribution vs. particle size of a disclosed carbon material comprises a correlation coefficient of 0.90 or greater, 0.95 or greater, 0.96 or greater, 0.97 or greater, 0.98 or greater, 0.99 or greater or even 0.995 or greater relative to the modified Andreassen equation for the given particle size distribution.

Another measure of the particle packing properties of an energy storage material is the packing ratio when incorporated into an electrode. While this metric may not correlate directly with the data obtained by comparing the particle size distribution to the modified Andreassen equation, it serves as another means to assess the packing efficiency of energy storage particles. The packing ratio is a measure of the density of the finished electrode compared to the expected density based on the mass and volume of the electrode components. A packing ratio of 1.0 would indicate that optimized packing has been achieved. A packing ratio of less than one indicates that less than optimum packing has been achieved, and a packing ratio of greater than one indicates that packing is optimized beyond that expected based on the mass and volume of the combined electrode components.

Surprisingly, the present inventors have found that in some embodiments when the particle size distribution is optimized according to the disclosed methods, the disclosed carbon materials comprise a high packing ratio for use as a gas storage material. TEM images of the carbon materials clearly show a higher carbon packing ratio in the optimized carbon versus the control carbon.

In some embodiments, the packing ratio of the disclosed carbon materials even exceeds 1.0. While not wishing to be bound by theory, one explanation for this unexpected result is that the unique mesoporosity of the carbon materials in combination with the particular particle size distributions of the carbon materials provides for insertion of carbon particles into the mesopores of the carbon material, thus increasing the packing ratio beyond 1.0. Such increased packing ratios provide for improved volumetric performance relative to carbon materials comprising a lower packing ratio. Accordingly, in some embodiments the disclosed carbon materials comprise packing ratios of 0.95 or greater, 0.97 or greater, 1.0 or greater, 1.05 or greater, 1.10 or greater, 1.15 or greater or 1.20 or greater.

EXAMPLES

Example 1. Apparatus to Measure Methane Adsorption

The apparatus to measure methane adsorption of carbon materials is depicted in FIG. 1. The sample chamber is attached via a valve to the dosing manifold affixed with high pressure transducer and a capacitance manometer in-line for pressure measurement. The dosing manifold allows access to the methane supply, vacuum, and vent, as shown.

Example 2. Example of Preparing Carbon Material for Gas Adsorption Measurement

For methane adsorption measurement, carbon particles were produced, and the carbon particles were subsequently compressed (using 4-8 Nm torque) into a threaded cylindrical mold to form a pellet.

Carbon particles were prepared by a number of different methods, as described above in the Specifications, for example by jet milling or by mechanical milling in a Fritsch-type mill. Where desired, particle size fractions were created by further sieving. Composite carbon particle samples were then created by mechanical mixing of the various desired input carbon particle fractions.

Example 3. Methodology for Gas Adsorption Measurement

For gas adsorption analysis, samples (prepared as described in Example 2) were placed into the sample chamber (of the apparatus as described in Example 1). Next, the sample chamber was evacuated, and the sample was heated to about 200 C and held under vacuum for at least six hours. The sample was then allowed to cool to reach room temperature before analyzing. For analysis, the sample chamber was dosed with sequentially increasing levels of methane gas. At each level, the sample was allowed to equilibrate with the dosed level of methane—as determined by no more than 0.001 mA reading off the capacitance manometer pressure gauge over 30 seconds (corresponding to about 0.06 psi). Using these data, gravimetric methane uptake and V/V were calculated as described above.

Example 4. Preparation of Carbon Materials Employing Solvent-Free Process

A monolithic, microporous polymer was formed using powder precursor materials. Exemplary raw materials in this regard are bisphenol A as monomer and hexamethylenetetramine as cross linking agent. The ratio of bisphenol A to hexamethylenetetramine was varied from 1:1 to 5:1. In certain instances, oxalic acid was added at a mol ratio of 1.63:1 hexamethylenetetramine:oxalic acid.

The powder mixtures were incubated at 140 C for varying time periods, for example overnight (corresponding to 18 hours). Over this period, the powders formed a polymer monolith. The polymer monolith was pyrolyzed and activated according to methods described elsewhere in the Specifications.

Example 5. Preparation of Carbon Materials Employing Solvent-Free Process

A composite of carbon powders was prepared according to Table 1. The various input carbon materials were prepared using polymers employing the solvent-free processing as described in Example 4, and were based on the ternary bisphenol A:hexamethylenetetramine:oxalic acid precursor system. Polymer was pyrolyzed and activated according to methods described elsewhere in the Specifications.

TABLE 1

Description of Various Carbon Materials.

| Component | Mass % | Surface Area | Pore Volume |
|---|---|---|---|
| 5-1 | 10.1% | 1383 | 0.571 |
| 5-2 | 17.0% | 1428 | 0.590 |
| 5-3 | 20.8% | 1487 | 0.607 |
| 5-4 | 19.0% | 1281 | 0.531 |
| 5-5 | 20.2% | 1239 | 0.510 |
| 5-6 | 12.8% | 1307 | 0.540 |

The mass average surface area of the composite sample was 1354 m2/g, and the mass average total pore volume was 0.558 cm3/g. In this case, the various input carbon materials were granular, and were then blended mechanically and then the composite blended sample was mechanically milled to create the final particle distribution for the composite sample. This composite sample was prepared into a pellet as described in Example 2, using a torque of 8 Nm. The resulting compressed sample for methane adsorption studies exhibited a density of 0.786 g/cm3, corresponding to 78% packing efficiency.

Methane adsorption measurement was carried out according to Example 3. The measurement yielded a V/V of 173 and a gravimetric methane adsorption of 0.111 g methane per g carbon. Using the packing efficiency, the calculated maximum theoretical V/V was 220.

Example 6. Preparation of Carbon Materials Employing Solvent-Free Process

A composite of carbon powders was prepared according to Table 2. The various input carbon materials were prepared using polymers employing the solvent-free processing as described in Example 4, and included both the bisphenol A:hexamine binary precursor system and the ternary bisphenol A:hexamethylenetetramine:oxalic acid precursor system.

TABLE 2

Description of Various Carbon Materials.

| Component | Mass % | Surface Area | Pore Volume |
|---|---|---|---|
| 6-1 | 15.5% | 1268 | 0.547 |
| 6-2 | 18.7% | 1416 | 0.584 |
| 6-3 | 5.7% | 1474 | 0.607 |
| 6-4 | 8.8% | 1426 | 0.586 |
| 6-5 | 3.3% | 1584 | 0.636 |
| 6-6 | 8.7% | 1324 | 0.563 |
| 6-7 | 18.5% | 1521 | 0.617 |
| 6-8 | 20.8% | 1339 | 0.529 |

The mass average surface area of the composite sample was 1398 m2/g, and the mass average total pore volume was 0.574 cm3/g. In this case, the various input carbon materials were granular, and were then blended mechanically and then the composite blended sample was mechanically milled to create the final particle distribution for the composite sample.

Example 7. Methane Adsorption of Carbon Material

A composite of carbon powders was prepared by combining the composite carbon sample from Example 5 (25%) and the composite carbon sample from Example 5 (75%). The mass average surface area of the composite sample was 1387 m2/g, and the mass average total pore volume was 0.570 cm3/g. The tap density was 0.564 g/cm3. In this case, the various input carbon materials were granular, and were then blended mechanically and then the composite blended sample was mechanically milled to create the final particle distribution for the composite sample. This composite sample was prepared into a pellet as described in Example 2, using a torque of 8 Nm. The resulting compressed sample for methane adsorption studies exhibited a density of 0.783 g/cm3, corresponding to 79% packing efficiency.

Methane adsorption measurement was carried out according to Example 3. The measurement yielded a V/V of 169 and a gravimetric methane adsorption of 0.108 g methane per g carbon. Using the packing efficiency, the calculated maximum theoretical V/V was 213.

Example 8. Methane Adsorption of Carbon Material

A composite of carbon powders was prepared (Table 3). The various input carbon materials were prepared using polymers employing the solvent-free processing as described in Example 4, and included both the bisphenol A:hexamine binary precursor system and the ternary bisphenol A:hexamethylenetetramine:oxalic acid precursor system.

TABLE 3

Description of Various Carbon Materials.

| Component | Mass % | Surface Area | Pore Volume |
|---|---|---|---|
| 8-1 | 34.1% | 1622 | 0.672 |
| 8-2 | 9.6% | 1692 | 0.700 |
| 8-3 | 5.6% | 1645 | 0.681 |
| 8-4 | 11.1% | 1673 | 0.692 |
| 8-5 | 8.6% | 1600 | 0.661 |
| 8-6 | 7.7% | 1819 | 0.756 |
| 8-7 | 3.0% | 1847 | 0.77 |

TABLE 3-continued

Description of Various Carbon Materials.

| Component | Mass % | Surface Area | Pore Volume |
|---|---|---|---|
| 8-8 | 7.1% | 1810 | 0.749 |
| 8-9 | 7.2% | 1562 | 0.639 |
| 8-10 | 6.0% | 1706 | 0.702 |

The mass average surface area of the composite sample was 1670 m2/g, and the mass average total pore volume was 0.691. The micropore distribution for this carbon is depicted in FIG. 2. In this case, the various input carbon materials were granular, and were then blended mechanically and then the composite blended sample was mechanically milled to create the final particle distribution for the composite sample. This composite sample was prepared into a pellet as described in Example 2. The particle size distribution for this carbon is depicted in FIG. 3. The resulting compressed sample for methane adsorption studies exhibited a density of 0.844 g/cm3 when compressed at 8 Nm, corresponding to 95.4% packing efficiency. Methane adsorption measurement was carried out according to Example 3. The measurement yielded a V/V of 203 and a gravimetric methane adsorption of 0.129 g methane per g carbon.

A duplicate sample was produced under compression of 4 Nm, resulting in a density for the compressed material of 0.797 g/cm3, corresponding to a 90.1% packing efficiency. Methane adsorption measurement was carried out according to Example 3. The measurement yielded a V/V of 199 and a gravimetric methane adsorption of 0.120 g methane per g carbon.

Example 9. Methane Adsorption of Various Carbon Materials

Carbon materials were prepared using polymers employing the solvent-free processing as described in Example 4, employing the binary bisphenol A:hexamethylenetetramine precursor system. Pyrolysis and activation was carried out, resulting in various samples as described in Table 4, the varying levels of surface area and pore volume were achieved by varying the duration of the activation process.

The individual samples were mechanically milled in a Fritsch-type mill and then prepared into pellets as described in Example 2. These samples were then analyzed for methane adsorption and the data are summarized in Table 4.

TABLE 4

Various Carbon Materials and Methane Adsorption Data

| Sample | Surface Area (m2/g) | Pore Volume (cm3/g) | Pellet Density (g/cm3) | Packing Efficiency (%) | V/V | Max. T. V/V | Gravimetric Methane Adsorption (g/g) |
|---|---|---|---|---|---|---|---|
| 9-1 | 1563 | 0.642 | 0.801 | 86.6 | 181 | 209 | 0.116 |
| 9-2 | 1730 | 0.716 | 0.643 | 74.2 | 176 | 237 | 0.139 |
| 9-3 | 1939 | 0.808 | 0.649 | 81.0 | 184 | 227 | 0.147 |

Example 10. Methane Adsorption of Various Carbon Materials

Carbon materials were prepared using polymers employing the solvent-free processing as described in Example 4, employing the ternary bisphenol A:hexamethylenetetramine:oxalic acid precursor system. Pyrolysis and activation was carried out, resulting in various samples as described in Table 5, the varying levels of surface area and pore volume were achieved by varying the duration of the activation process.

The individual samples were mechanically milled in a Fritsch-type mill and then prepared into pellets as described in Example 2. These samples were then analyzed for methane adsorption and the data are summarized in Table 5. Samples 10-1 to 10-5 were homogeneous with respect to surface area and pore volume. Sample 10-6 was created by mechanically milling a 20:80 w:w: mixture of sample 10-1 and 10-4. Sample 10-7 was created by mechanically milling a 50:50 w:w: mixture of sample 10-1 and 10-4. Sample 10-8 was created by mechanically milling a 80:20 w:w: mixture of sample 10-1 and 10-4.

TABLE 5

Various Carbon Materials and Methane Adsorption Data

| Sample | Surface Area (m2/g) | Pore Volume (cm3/g) | Pellet Density (g/cm3) | Packing Efficiency (%) | V/V | Max. Th. V/V | Gravimetric Methane Adsorption (g/g) |
|---|---|---|---|---|---|---|---|
| 10-1 | 1575 | 0.653 | 0.587 | 64.1% | 159 | 248 | 0.132 |
| 10-2 | 1664 | 0.687 | 0.695 | 78.3% | 165 | 211 | 0.116 |
| 10-3 | 2039 | 0.853 | 0.546 | 70.5% | 181 | 257 | 0.171 |
| 10-4 | 2358 | 1.01 | 0.579 | 84.0% | 166 | 198 | 0.142 |
| 10-5 | 2528 | 1.116 | 0.572 | 88.9% | 179 | 201 | 0.161 |
| 10-6 (20:80, w:w, 10-1:10-5) | 2201 | 0.939 | 0.637 | 87.8% | 177 | 202 | 0.141 |
| 10-7 (50:50, w:w, 10-1:10-5) | 1967 | 0.832 | 0.624 | 79.3% | 170 | 214 | 0.137 |
| 10-8 (80:20, w:w, 10-1:10-5) | 1732 | 0.724 | 0.700 | 81.5% | 175 | 215 | 0.127 |

A plot of max theoretical V/V vs pore volume is depicted in FIG. 4, using data as compiled for various samples described in Examples 9 and 10. A plot of gravimetric methane adsorption vs pore volume is depicted in FIG. 4, using data as compiled for various samples described in Examples 9 and 10.

Example 11. Preparation of Activated Carbon from Monolithic Polymer Resin

In this example, a monolithic microporous dried polymer gel (formed from resorcinol, formaldehyde, and a volatile basic salt in the presence of a water acetic acid co-solvent system as described previously) is reacted in a hotbox oven set to 90° C. This is size reduced via a rock crusher and solvent removed using a lyophilization process.

A pyrolyzed carbon from this sample is fed into a rotary kiln system under inert atmosphere (nitrogen gas flow) at range of 600-800° C. This pyrolyzed carbon was fed into a fluidized bed reactor and heated under inert nitrogen atmosphere to 880° C. and then exposed to reactive carbon dioxide atmosphere. The carbon was cooled under nitrogen once the desired specific surface area was achieved.

The granular activated carbon was fed into an 8" Jet Mill and milled to the desired particle distribution. This particle distribution is depicted in FIG. 6. The surface area was 1819 m2/g, the pore volume 0.763 cm3/g, the tap density was 0.66 g/cm3. The micropore distribution is depicted in FIG. 7.

This jet milled carbon was prepared into a pellet as described in Example 2. The resulting compressed sample for methane adsorption studies exhibited a density of 0.745 g/cm3 when compressed at 4 Nm, corresponding to 90% packing efficiency. Methane adsorption measurement was carried out according to Example 3. The measurement yielded a V/V of 177 and a gravimetric methane adsorption of 0.121 g methane per g carbon. Using the packing efficiency, the calculated maximum theoretical V/V was 198.

C. for 12-24 hours. The resulting material was then treated in a tube furnace at 800° C. under inert atmosphere (nitrogen gas flow) for 60 minutes.

Example 13. Nitrogen Content of Various Carbon Compositions

A range of carbon materials produced from the range of chemistries as detailed in Example 4 and Example 11 were tested for Total Nitrogen Content on a Perkin Elmer CHN Analyzer Model 2400. The samples are described in Table 6, the methane adsorption data are described in Table 7.

TABLE 6

Description of various carbon samples of Example 13.

| Sample | Nitrogen Content (%) | Preparation Process |
|---|---|---|
| 13-1 | 8.1% | Carbon produced as described in Example 4, carbon further treated as described in example 12. |
| 13-2 | Not determined | Carbon produced as described in Example 4, carbon further treated as described in example 12. |
| 13-3 | 3.6% | Carbon produced as described in Example 4 |
| 13-4 | 3.4% | Carbon produced as described in Example 4 |
| 13-5 | 1.3% | Carbon produced as described in Example 4 |
| 13-6 | Not determined | Carbon 13-5, further activated |
| 13-7 | 0.9% | Carbon produced as described in Example 11. |

TABLE 7

Characterization of various carbon samples of Example 13.

| Sample | Surface Area (m2/g) | Pore Volume (cm3/g) | Pellet Density (g/cm3) | Packing Efficiency (%) | V/V | Max. Th. V/V | Gravimetric Methane Adsorption (g/g) |
|---|---|---|---|---|---|---|---|
| 13-1 | 794 | 0.338 | | | Not determined | | |
| 13-2 | 1840 | 0.778 | 0.716 | 87.1% | 183 | 227 | 0.132 |
| 13-3 | 0.3 | Not detected | | | Not determined | | |
| 13-4 | 0.2 | Not detected | | | Not determined | | |
| 13-5 | 1310 | 0.541 | | | Not determined | | |
| 13-6 | 1560 | 0.649 | 0.892 | 97.0 | 188 | 194 | 0.110 |
| 13-7 | 1752 | 0.719 | 0.658 | 77.0% | 174 | 225 | 0.133 |

Example 12. Preparation of Activated Carbon with High Nitrogen Content

Solid state reacted materials using a nitrogen-containing cross-linker like Hexamethylenetetramine produce activated carbon materials in the 1-4% of total mass in the final carbon form.

Activated and pyrolyzed carbon materials are produced with even higher nitrogen contents by solid state reacting with nitrogen-containing chemicals such as urea and hexamethylenetetramine. Pyrolyzed and activated carbons described in Example 11 were mixed with a nitrogen-containing chemicals with a mortar and pestle in a 1:1 by mass ratio. This mixture was heated in an oven set to 130°

Example 14. Pellets Produced from Activated Carbon

A pellet was produced from carbon pyrolyzed and activated in the manner described in example 11. The carbon was mixed into a water based slurry comprised of activated carbon with 3 wt % (of carbon) Lico binder and a carbon to water ratio of 1:1.5 w:w. The slurry was dried in a convection oven for 12 hours. The dried slurry was then ground using a mortar and pestle until the carbon material consistency returned to that of the micronized material. Approximately, 0.250 g±0.02 g of dry carbon material was loaded in a pressing die and pressed between 1 and 2 standard tons for 10 seconds. Without removing the pellet, the whole die was placed in a convection oven @ 125° C. for 15 minutes. While still warm the pellet was repressed at 1 to 2 standard tons for 10 seconds. After allowing the die to cool, the pellet was pressed out of the die yielding a completed pellet. The resulting pellet had a surface area of 1453 m2/g, a pore volume of 0.659 cm3/g, and a density of 0.887 g/cm3. The gravimetric methane adsorption was 0.085 g/g and the V/V was 156 v/v.

Example 15. Monoliths Produced from Activated Carbon

A monolith was produced from carbon pyrolyzed and activated in the manner described in example 11. The monolith was produced from a combination of activated carbon and novolac binder at a ratio of 1:1 w:w. The resulting dry powder was combined and mixed using the vortex mixer. The blended material was then weighed between 0.150 g and 0.250 g and loaded into the pressing die. Dry powder was pressed in die at 1 to 2 standard tons for 10 sec. The die containing pressed powder was then placed in a convection oven for 12 hours at 225° C. to allow for the resin to cure in the interstitial carbon particles spacing. The pellet was then pressed out of the die and placed in a tube furnace and pyrolyzed for 1 hour under Nitrogen at 900° C. The pellet was then subsequently activated to further increase the surface area for 2 hours at 900° C. under CO2. The resulting pellet had a surface area of 1647 m2/g, a pore volume of 0.743 cm3/g, and a density of 0.817 g/cm3. The gravimetric methane adsorption was 0.099 g/g and the V/V was 160.

Example 16. Density and v/v for Various Activated Carbons

A variety of milled activated carbons were produced from various synthetic precursors according to the general procedures described herein. The individual samples were compressed at pressures ranging from 4-8 Newtons and measured for density and v/v (methane gas) as generally described herein. FIG. 8 depicts the plot of density vs v/v. Each point in FIG. 8 represents a different carbon material prepared according to the methods described herein. As can be seen carbon materials having different combinations of densities and v/v can be prepared. In some instances, the carbon samples achieved at least 0.7 g/cm$^3$ density and at least 170 v/v, in some instances at least 0.7 g/cm$^3$ density and at least 180 v/v, in some instances at least 0.8 g/cm$^3$ density and at least 180 v/v, in some instances at least 0.8 g/cm$^3$ density and at least 200 v/v. Densities in these embodiments refers to compression density, i.e., the density of a carbon material after applying a force ranging from about 0.1 to about 10 Newtons on the carbon material, for example from about 4 to about 8 Newtons.

Example 17. Production of Carbon Monolith as a Wafer

Milled activated carbon was produced from synthetic precursors according to the general procedures described herein. The milled carbon particles were bonded into a monolith as follows. The particles were suspended in acetone in the presence of a novolac material and the mixture heated in a mold to create a contiguous monolith wafer. This monolith was then heated under nitrogen to result in a pyrolyzed carbon monolith. The density of the monolith was measured as 0.80 g/cm$^3$, the specific surface area and total pore volume by nitrogen sorption as 1450 m$^2$/g and 0.617 cm$^3$/g.

Example 18. Utilization of Activated Carbons Particles in Gas Storage Device

Activated carbon particles are produced according to the general procedures described herein. These particles achieve various combinations of density and v/v as described in Example 16, for example the carbon samples are greater than 0.7 g/cm$^3$ density and greater than 170 v/v, in some instances 0.7 g/cm$^3$ density and greater than 180 v/v, in some instances 0.8 g/cm$^3$ density and greater than 180 v/v, in some instances 0.8 g/cm$^3$ density and greater than 200 v/v. In some embodiments, the density is determined after applying a force ranging from 0.1 to 10 Newtons on the carbon particles.

The carbons are filled into a pressure vessel. The vessel is sealed by means of a filter and valve assembly. The carbon filled vessel is filled and pressurized with a variety of different energy storage gases, including, but not limited to, methane, ethane, hydrogen, natural gas, or any combinations thereof. The carbon-filled vessel is capable of adsorbing and desorbing (charging and discharging the stored gas of choice) in a similar fashion to standard compressed gas storage tanks (such as standard compressed natural gas tanks).

Example 19. Utilization of Pyrolyzed Carbon Monolith in Gas Storage Device

A monolith of pyrolyzed carbon is prepared according to the general procedures described herein. These pyrolyzed carbon monolith is encapsulated into a pressure vessel. The vessel is then sealed by means of a filter and valve assembly. The carbon filled vessel is filled and pressurized with a variety of different energy storage gases, including, but not limited to, methane, ethane, hydrogen, natural gas, or any combinations thereof. The carbon-filled vessel is capable of adsorbing and desorbing (charging and discharging the stored gas of choice) in a similar fashion to standard compressed gas storage tanks (such as standard compressed natural gas tanks).

Example 20. Utilization of Activated Carbon Monolith in Gas Storage Device

A monolith of activated carbon is produced according to the general procedures described herein. The pyrolyzed carbon monolith is encapsulated into a pressure vessel. The vessel is then sealed by means of a filter and valve assembly. The carbon filled vessel is filled and pressurized with a variety of different energy storage gases, including, but not limited to, methane, ethane, hydrogen, natural gas, or any combinations thereof. The carbon-filled vessel is capable of adsorbing and desorbing (charging and discharging the stored gas of choice) in a similar fashion to standard compressed gas storage tanks (such as standard compressed natural gas tanks).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Provisional Application No. 61/900,310, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A carbon material having:
   a tap density of 0.5 g/cm$^3$ or greater;
   a surface area of 1000 m$^2$/g or greater;
   a total pore volume of 0.5 cm$^3$/g or greater; and
   a gravimetric methane adsorption of 0.10 g/g or greater at room temperature and 50 bar pressure.

2. The carbon material of claim 1, wherein the surface area is 1200 m$^2$/g or greater.

3. The carbon material of claim 1, wherein the surface area is 1500 m$^2$/g or greater.

4. The carbon material of claim 1, wherein the total pore volume is 0.7 cm$^3$/g or greater.

5. The carbon material of claim 1, wherein the gravimetric methane adsorption is 0.11 g/g or greater at room temperature and 50 bar pressure.

6. The carbon material of claim 1, wherein the gravimetric methane adsorption is 0.12 g/g or greater at room temperature and 50 bar pressure.

7. The carbon material of claim 1, wherein the gravimetric methane adsorption is 0.15 g/g or greater at room temperature and 50 bar pressure.

8. The carbon material of claim 1, wherein the gravimetric methane adsorption is 0.17 g/g or greater at room temperature and 50 bar pressure.

9. The carbon material of claim 1, wherein the carbon material comprises a mixture of two or more populations of particles, wherein from 5%-30% of the particles have a surface area below 1500 m$^2$/g, from 10%-80% of the particles have a surface area of from 1500 m$^2$/g to 1800 m$^2$/g and from 5-30% of the particles have a surface area greater than 1800 m$^2$/g.

10. The carbon material of claim 1, wherein the carbon material comprises a mixture of two or more populations of particles, wherein from 20-80% of the particles have a surface area of 1600 m$^2$/g or lower and from 20-80% of particles have a surface area of 2000 m$^2$/g or higher.

11. The carbon material of claim 1, wherein the carbon material comprises a pore volume and from 1-40% of the pore volume resides in mesopores, and from 1-50% of the pore volume resides in macropores.

12. The carbon material of claim 1, wherein the volume average particle size Dv,50 of the carbon material is between 0.1 um and 50 mm.

13. A gas storage device comprising the carbon material of claim 1.

14. The device of claim 13, wherein the gas storage capacity retention of the device at 1000 cycles is 80% or greater.

15. The carbon material of claim 1, further comprising nitrogen, silicon, sulfur or combinations thereof.

16. The carbon material of claim 15, comprising the silicon.

17. A carbon material having a gravimetric methane adsorption of 0.10 g/g or greater at room temperature and 50 bar pressure, wherein the carbon material comprises a mixture of two or more populations of particles, wherein from 5%-30% of the particles have a surface area below 1500 m$^2$/g, from 10%-80% of the particles have a surface area of from 1500 m$^2$/g to 1800 m$^2$/g and from 5-30% of the particles have a surface area greater than 1800 m$^2$/g.

18. The carbon material of claim 17, wherein the gravimetric methane adsorption is 0.11 g/g or greater at room temperature and 50 bar pressure.

19. The carbon material of claim 17, wherein the gravimetric methane adsorption is 0.12 g/g or greater at room temperature and 50 bar pressure.

20. The carbon material of claim 17, wherein the tap density is 0.6 g/cm$^3$ or greater, the surface area is 1200 m$^2$/g or greater and the total pore volume is 0.7 cm$^3$/g or greater.

21. The carbon material of claim 17, wherein the carbon material comprises a pore volume and from 1-40% of the pore volume resides in mesopores, and from 1-50% of the pore volume resides in macropores.

22. The carbon material of claim 17, wherein the volume average particle size Dv,50 of the carbon material is between 0.1 μm and 50 mm.

23. The carbon material of claim 17, further comprising nitrogen, silicon, sulfur or combinations thereof.

24. The carbon material of claim 23, comprising the silicon.

25. A gas storage device comprising the carbon material of claim 17.

26. The device of claim 25, wherein a gas storage capacity retention of the device at 1000 cycles is 80% or greater.

27. A carbon material having a gravimetric methane adsorption of 0.10 g/g or greater at room temperature and 50 bar pressure, wherein the carbon material comprises a mixture of two or more populations of particles, wherein from 20-80% of the particles have a surface area of 1600 m$^2$/g or lower and from 20-80% of particles have a surface area of 2000 m$^2$/g or higher.

28. The carbon material of claim 27, wherein the gravimetric methane adsorption is 0.11 g/g or greater at room temperature and 50 bar pressure.

29. The carbon material of claim 27, wherein the specific gravimetric methane adsorption is 0.12 g/g or greater at room temperature and 50 bar pressure.

30. The carbon material of claim 27, wherein the tap density is 0.6 g/cm$^3$ or greater, the surface area is 1200 m$^2$/g or greater and the total pore volume is 0.7 cm$^3$/g or greater.

31. The carbon material of claim 27, wherein the carbon material comprises a pore volume and from 1-40% of the pore volume resides in mesopores, and from 1-50% of the pore volume resides in macropores.

32. The carbon material of claim 27, wherein the volume average particle size Dv,50 of the carbon material is between 0.1 μm and 50 mm.

33. The carbon material of claim 27, further comprising nitrogen, silicon, sulfur or combinations thereof.

34. The carbon material of claim 33, comprising the silicon.

35. A gas storage device comprising the carbon material of claim 27.

36. The device of claim 35, wherein the gas storage capacity retention of the device at 1000 cycles is 80% or greater.

* * * * *

UNITED STATES PATENT AND TRADEMARK OFFICE
CERTIFICATE OF CORRECTION

Page 1 of 2

PATENT NO. : 12,064,747 B2
APPLICATION NO. : 18/328634
DATED : August 20, 2024
INVENTOR(S) : Henry R. Costantino et al.

It is certified that error appears in the above-identified patent and that said Letters Patent is hereby corrected as shown below:

In the Specification

Column 2, Line 51: "(Dv,50)" should read: -- (Dv50) .--.

Column 2, Line 52: "0.1 um" should read: -- 0.1 µm --.

Column 3, Line 15: "Dv,50" should read: -- Dv50 .--.

Column 3, Line 16: "0.1 um" should read: -- 0.1 µm --.

Column 3, Line 46: "Dv,50" should read: -- Dv50 .--.

Column 3, Line 46: "0.1 um" should read: -- 0.1 µm --.

Column 35, Lines 14-15: "(Dv,90-Dv,10)/Dv,50, wherein Dv,10, Dv,50 and Dv,90" should read:
-- (Dv90-Dv10)/Dv50, wherein Dv10, Dv50 and Dv90 --.

Column 37, Line 67: "(Dv,50)" should read: -- (Dv50) --.

Column 38, Line 1: "0.1um" should read: -- 0.1 µm --.

Column 38, Line 1: "Dv,50" should read: -- Dv50 --.

Column 38, Line 2: "1 um and 10 um." should read: -- 1 µm and 10 µm. --.

Column 38, Line 2: "Dv,50" should read: -- Dv50 --.

Column 38, Line 3: "5 um and 20 um." should read: -- 5 µm and 20 µm. --.

Signed and Sealed this
Fifth Day of November, 2024

Katherine Kelly Vidal
*Director of the United States Patent and Trademark Office*

CERTIFICATE OF CORRECTION (continued)
U.S. Pat. No. 12,064,747 B2

Column 38, Line 4: "Dv,50 is between 10 um and 100 um." should read: -- Dv50 is between 10 μm and 100 μm. --.

Column 38, Line 5: "Dv,50 is about 100 um. In some embodiments, the Dv,50" should read: -- Dv50 is about 100 μm. In some embodiments, the Dv50 --.

Column 38, Line 6: "100 um" should read: -- 100 μm --.

Column 38, Line 7: "Dv,50 is about" should read: -- Dv50 is about --.

Column 38, Line 7: "the Dv,50 is" should read: -- the Dv50 is --.

In the Claims

Column 49, Claim 12, Line 55: "Dv,50" should read: -- Dv50 --.

Column 49, Claim 12, Line 56: "0.1 um" should read: -- 0.1 μm --.

Column 50, Claim 22, Line 23: "Dv,50" should read: -- Dv50 --.

Column 50, Claim 32, Line 54: "Dv,50" should read: -- Dv50 --.